Oct. 28, 1924.

W. C. HUEBNER 1,513,321

PHOTOGRAPHIC PRINTING APPARATUS

Filed Oct. 16, 1920    17 Sheets-Sheet 1

INVENTOR.
William C. Huebner
By Parker & Prochnow.
ATTORNEYS.

Oct. 28, 1924.  
W. C. HUEBNER  
1,513,321  
PHOTOGRAPHIC PRINTING APPARATUS  
Filed Oct. 16, 1920  17 Sheets-Sheet 3

INVENTOR.  
William C. Huebner  
By Parker Prockwow  
ATTORNEYS.

Oct. 28, 1924.
W. C. HUEBNER
1,513,321
PHOTOGRAPHIC PRINTING APPARATUS
Filed Oct. 16, 1920     17 Sheets-Sheet 4
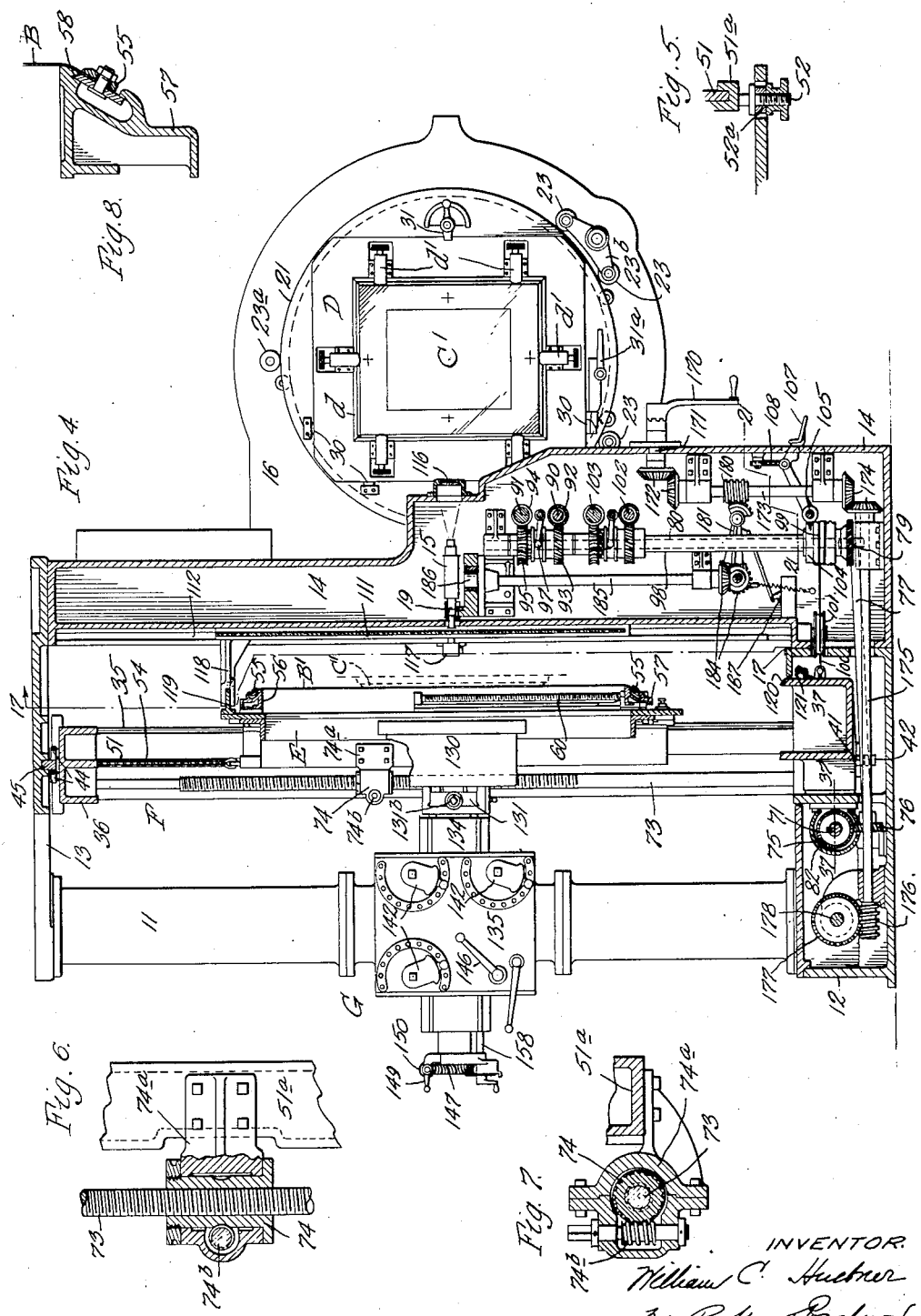
INVENTOR.
William C. Huebner
By Parker Brockwow.
ATTORNEYS.

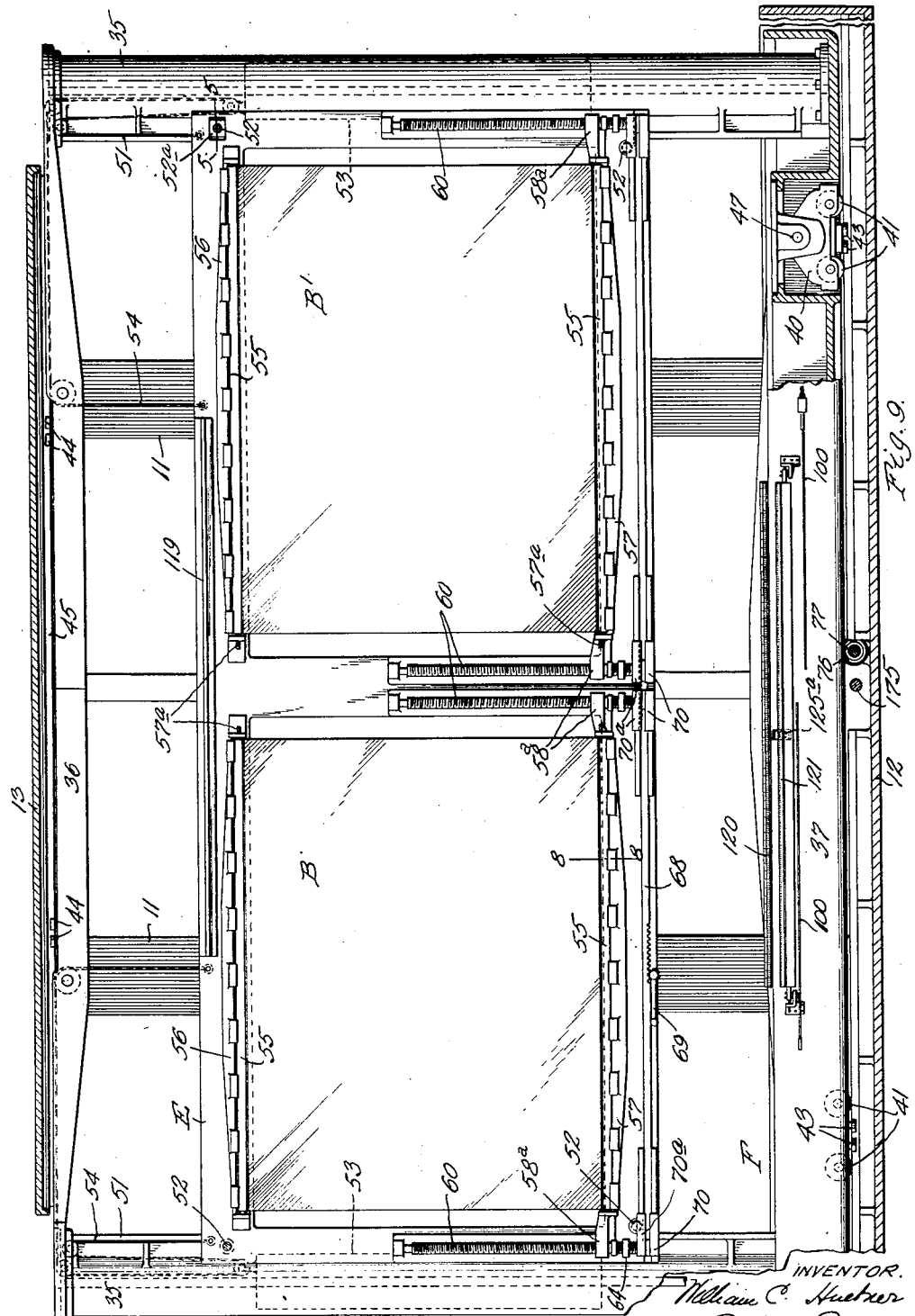

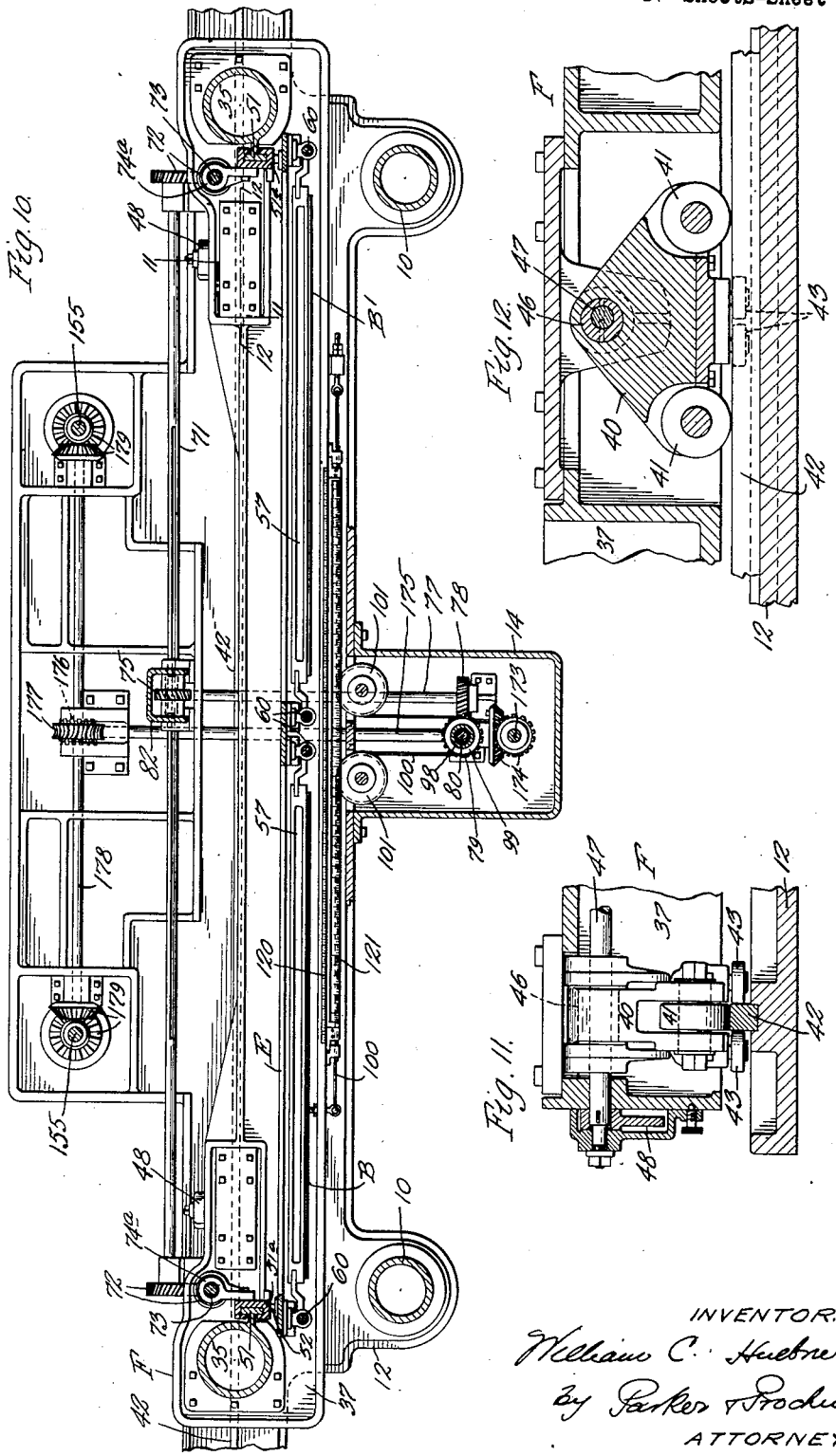

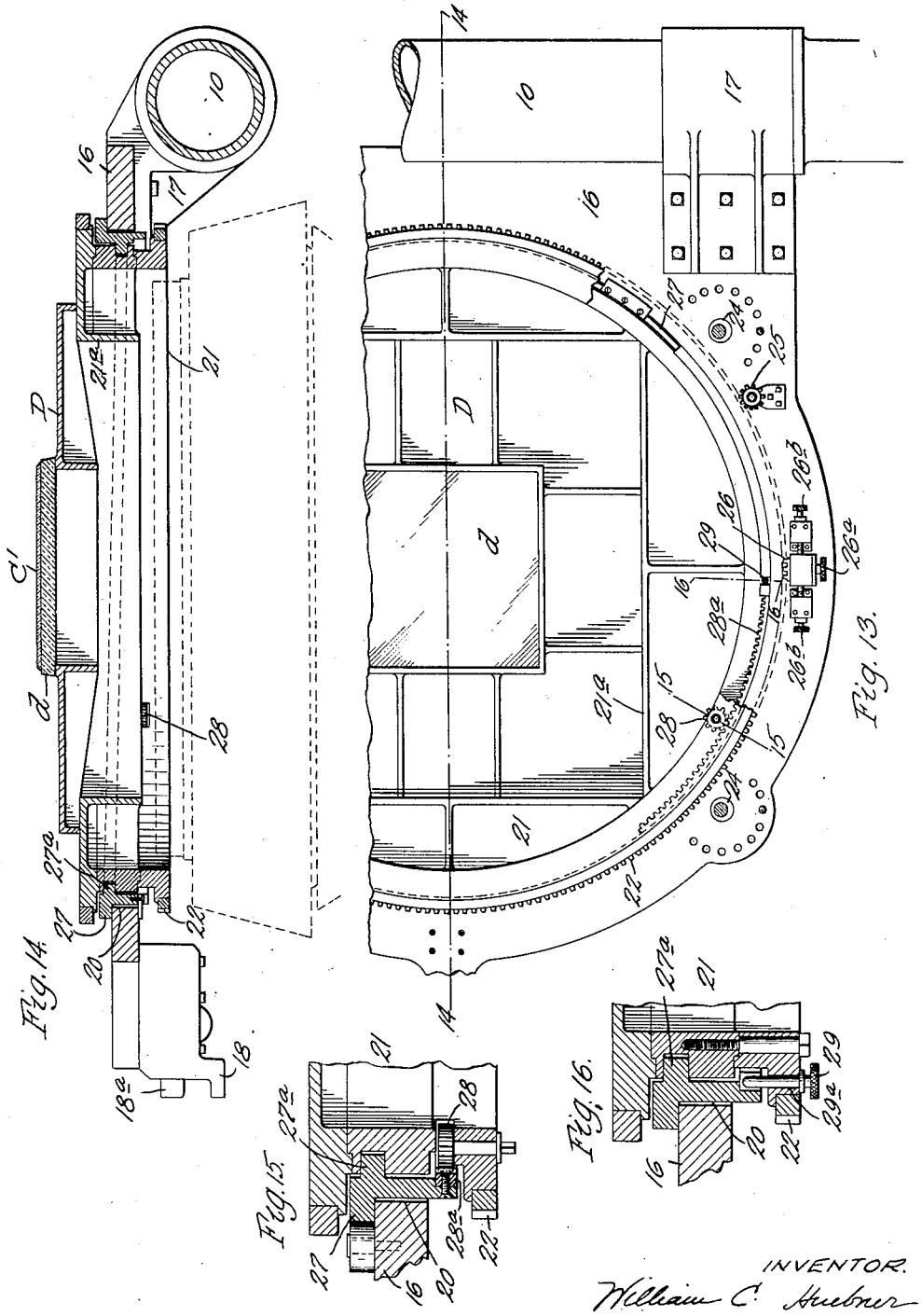

Oct. 28, 1924.
W. C. HUEBNER
1,513,321
PHOTOGRAPHIC PRINTING APPARATUS
Filed Oct. 16, 1920  17 Sheets-Sheet 8
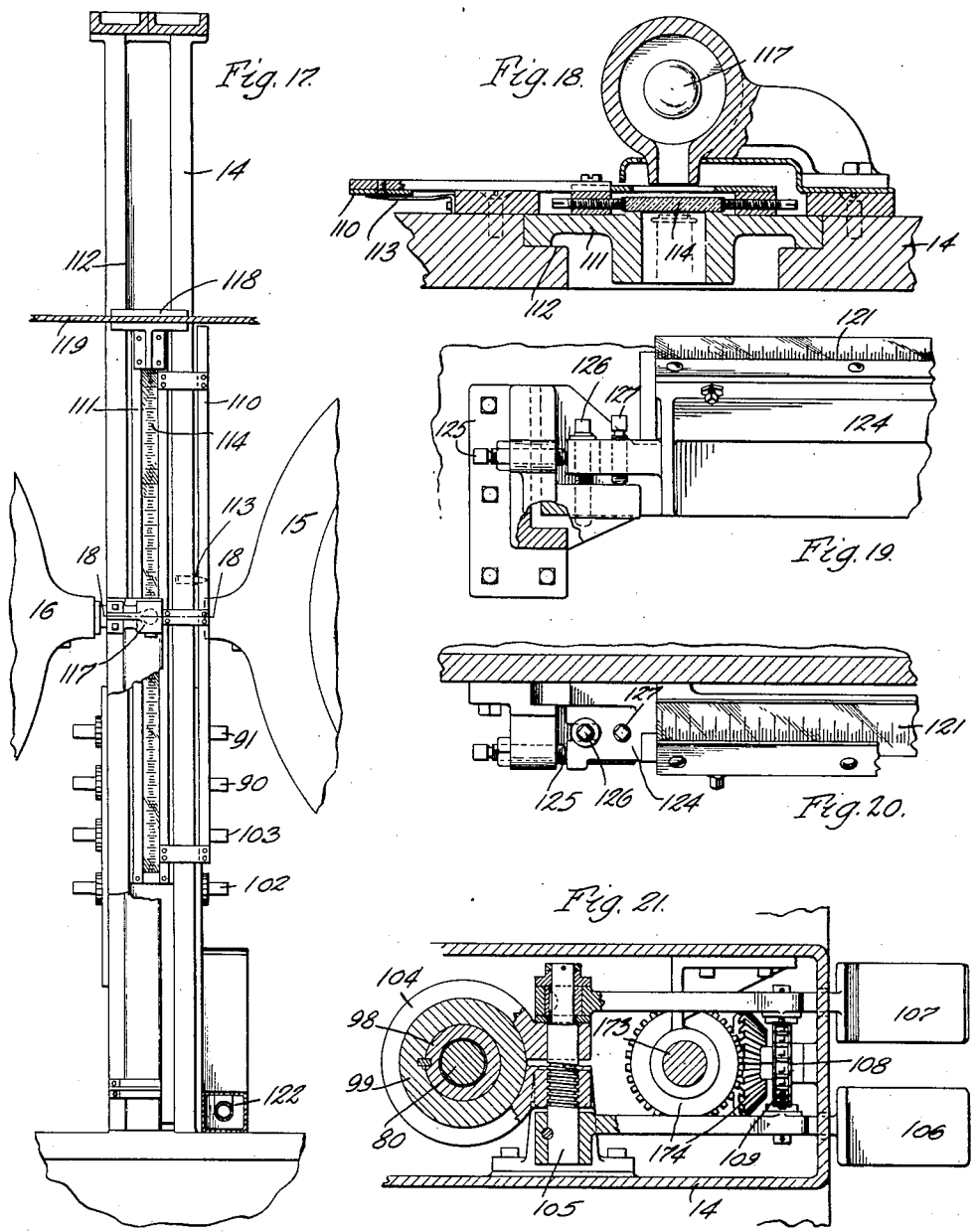
INVENTOR.
William C. Huebner
by Parker Prochnow
ATTORNEYS.

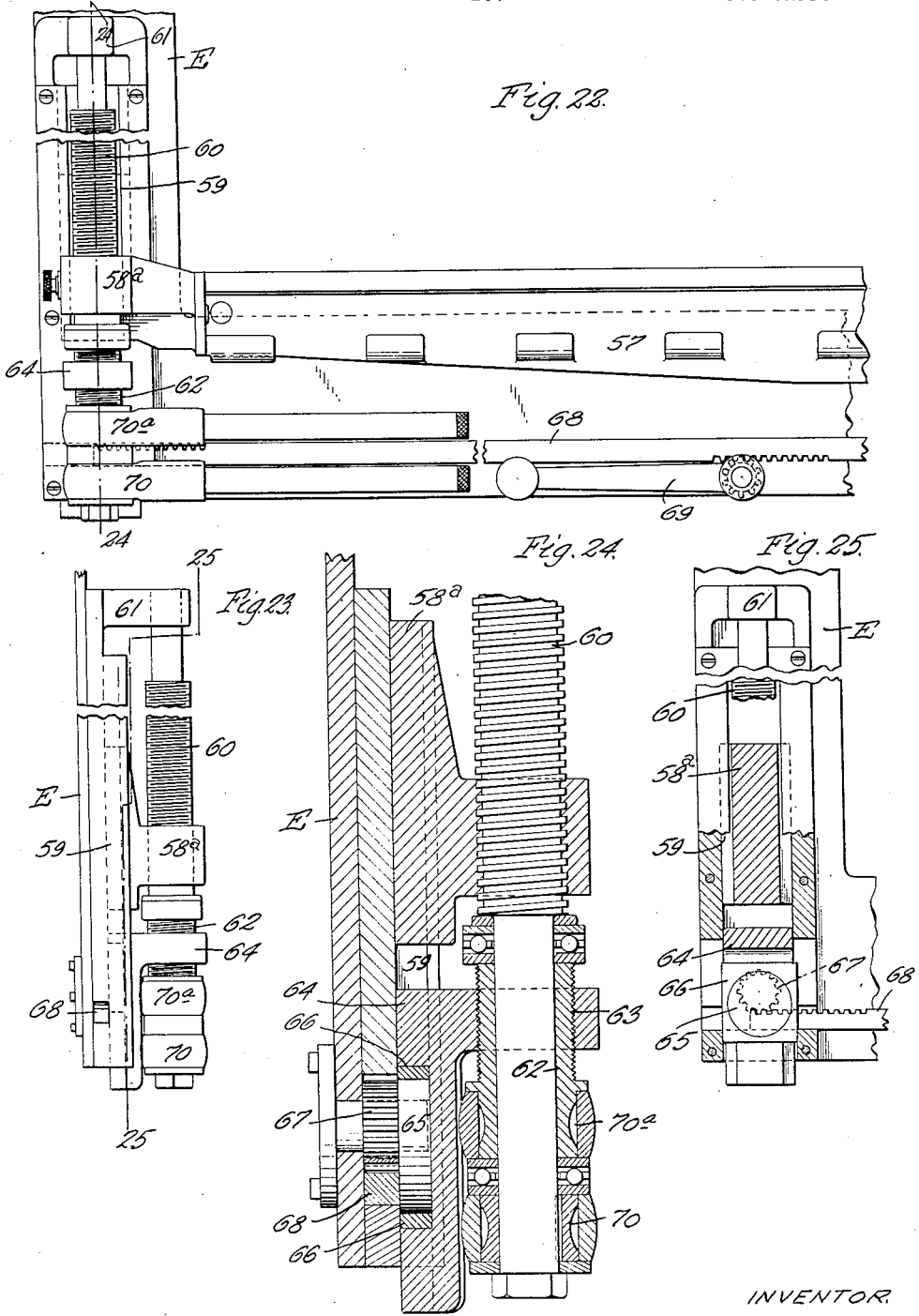

Oct. 28, 1924.                                                               1,513,321
W. C. HUEBNER
PHOTOGRAPHIC PRINTING APPARATUS
Filed Oct. 16, 1920        17 Sheets-Sheet 10
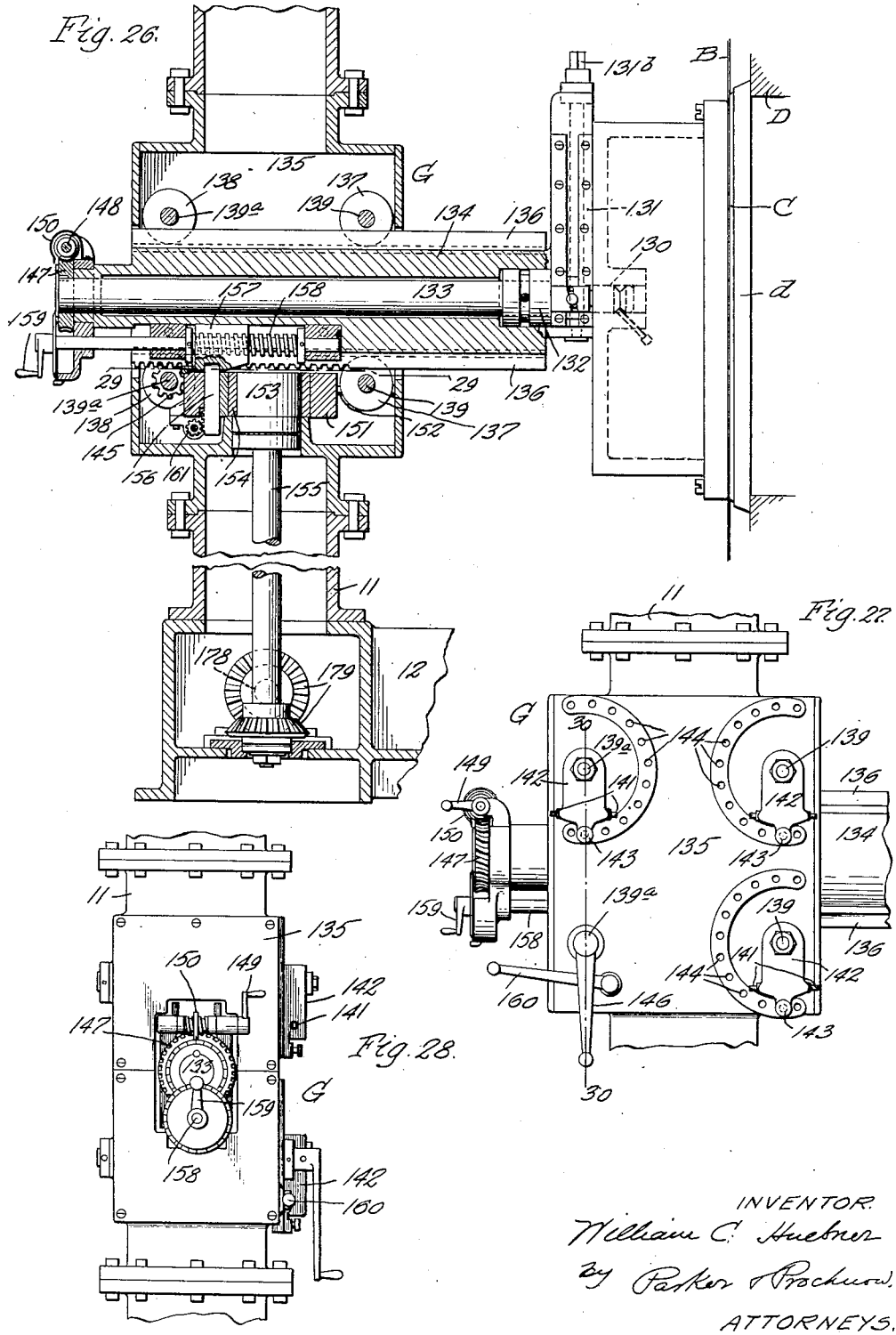

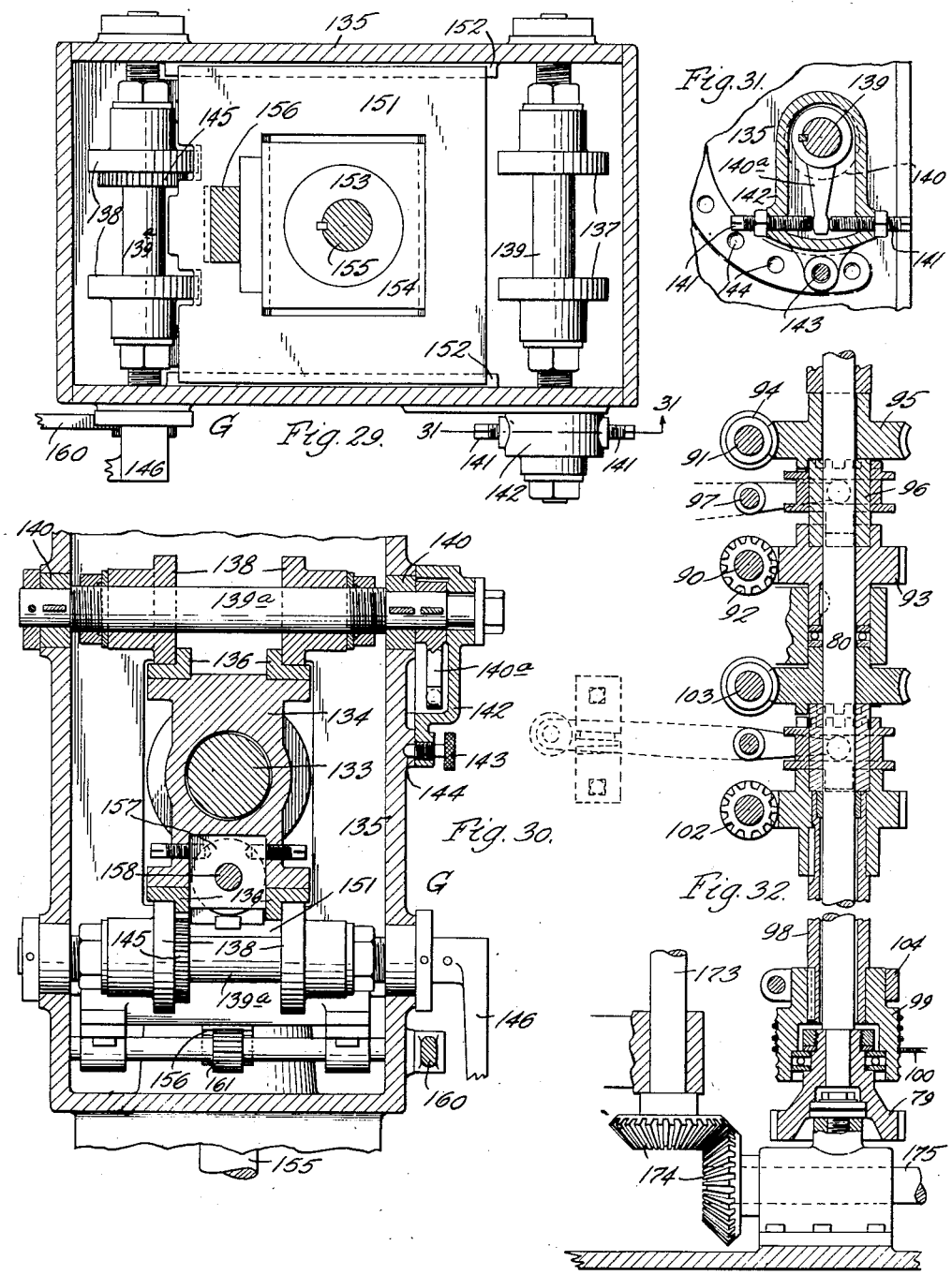

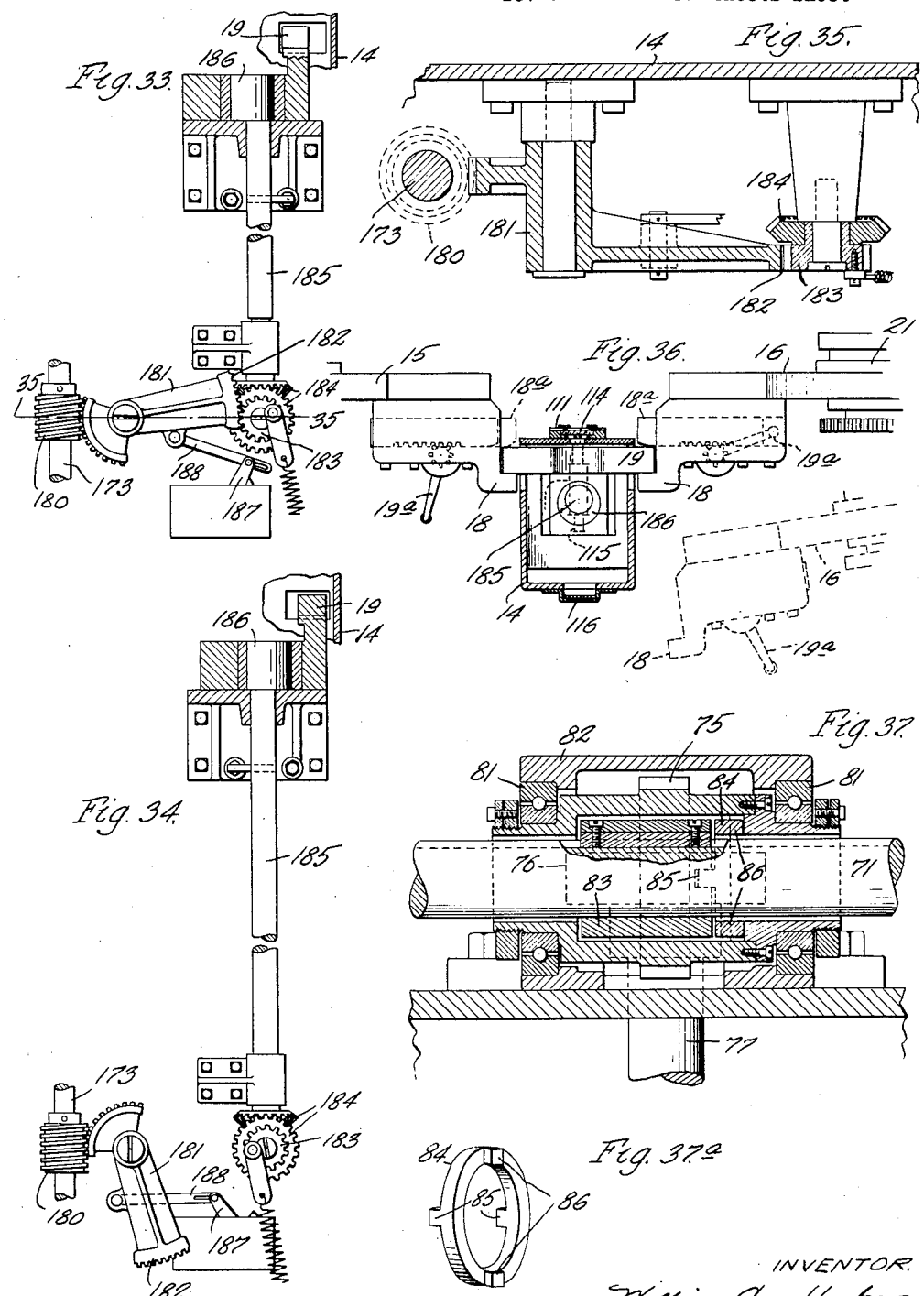

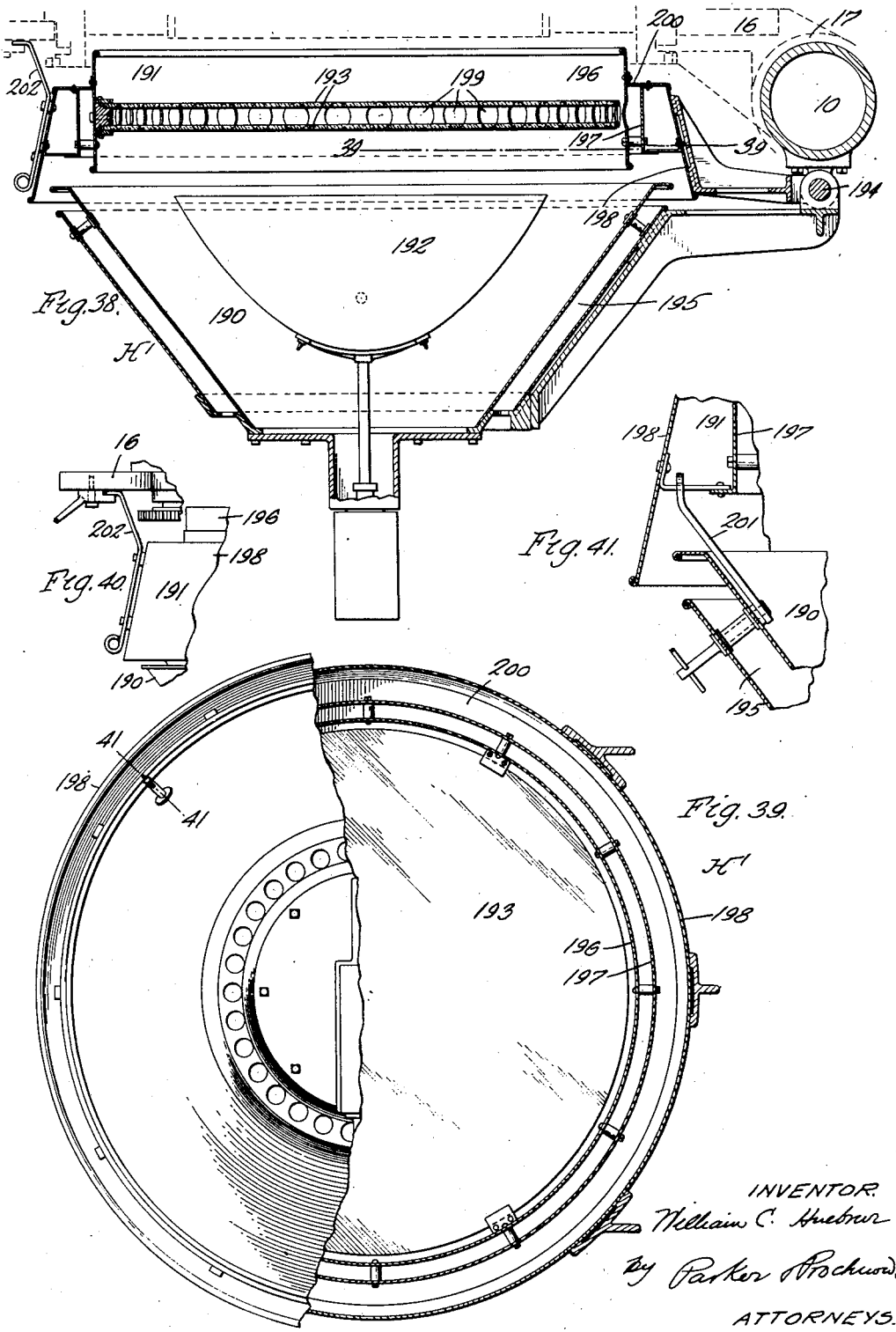

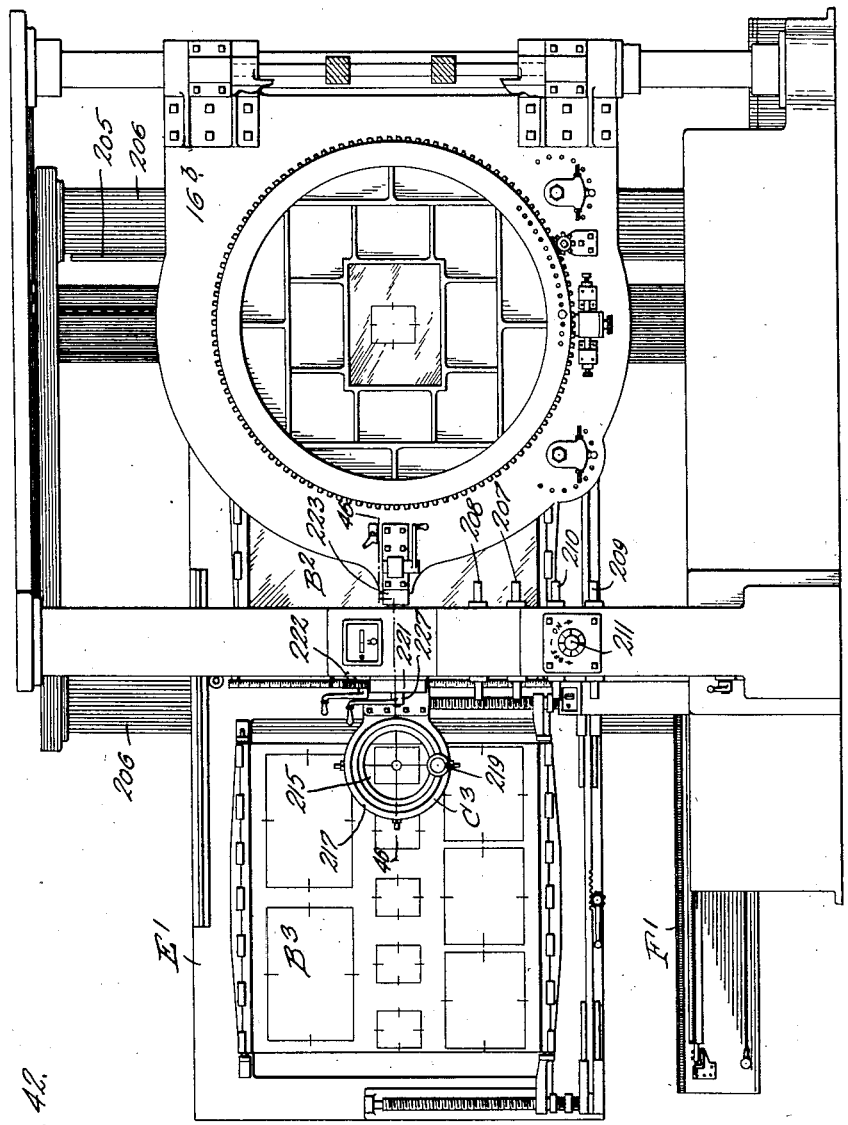

Oct. 28, 1924.
W. C. HUEBNER
1,513,321
PHOTOGRAPHIC PRINTING APPARATUS
Filed Oct. 16, 1920 17 Sheets-Sheet 15
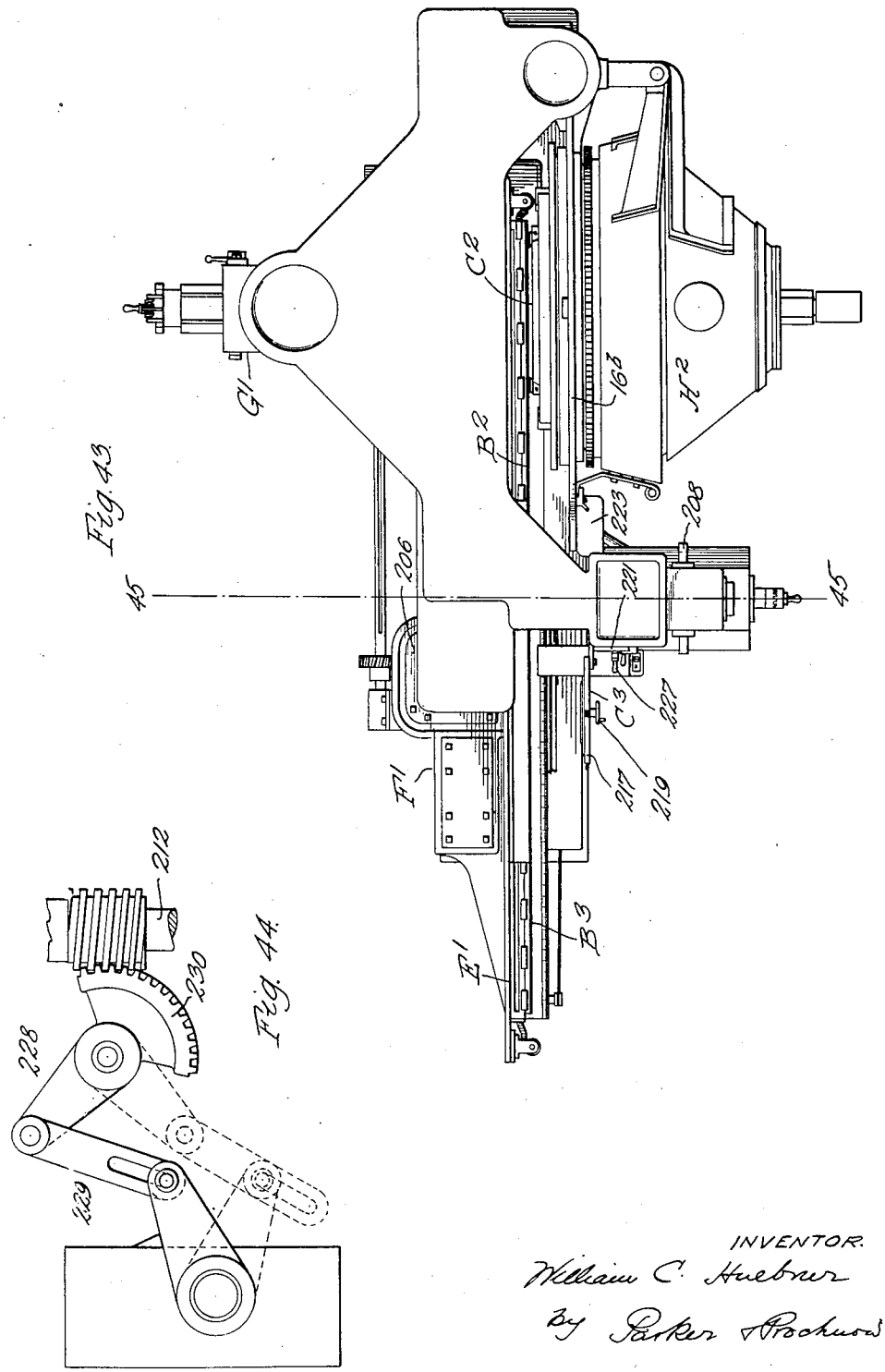
INVENTOR.
William C. Huebner
by Parker & Prochwd.
ATTORNEYS.

Oct. 28, 1924.

W. C. HUEBNER

PHOTOGRAPHIC PRINTING APPARATUS

Filed Oct. 16, 1920 17 Sheets-Sheet 16

1,513,321

INVENTOR.
William C. Huebner
By Parker & Stockwood.
ATTORNEYS.

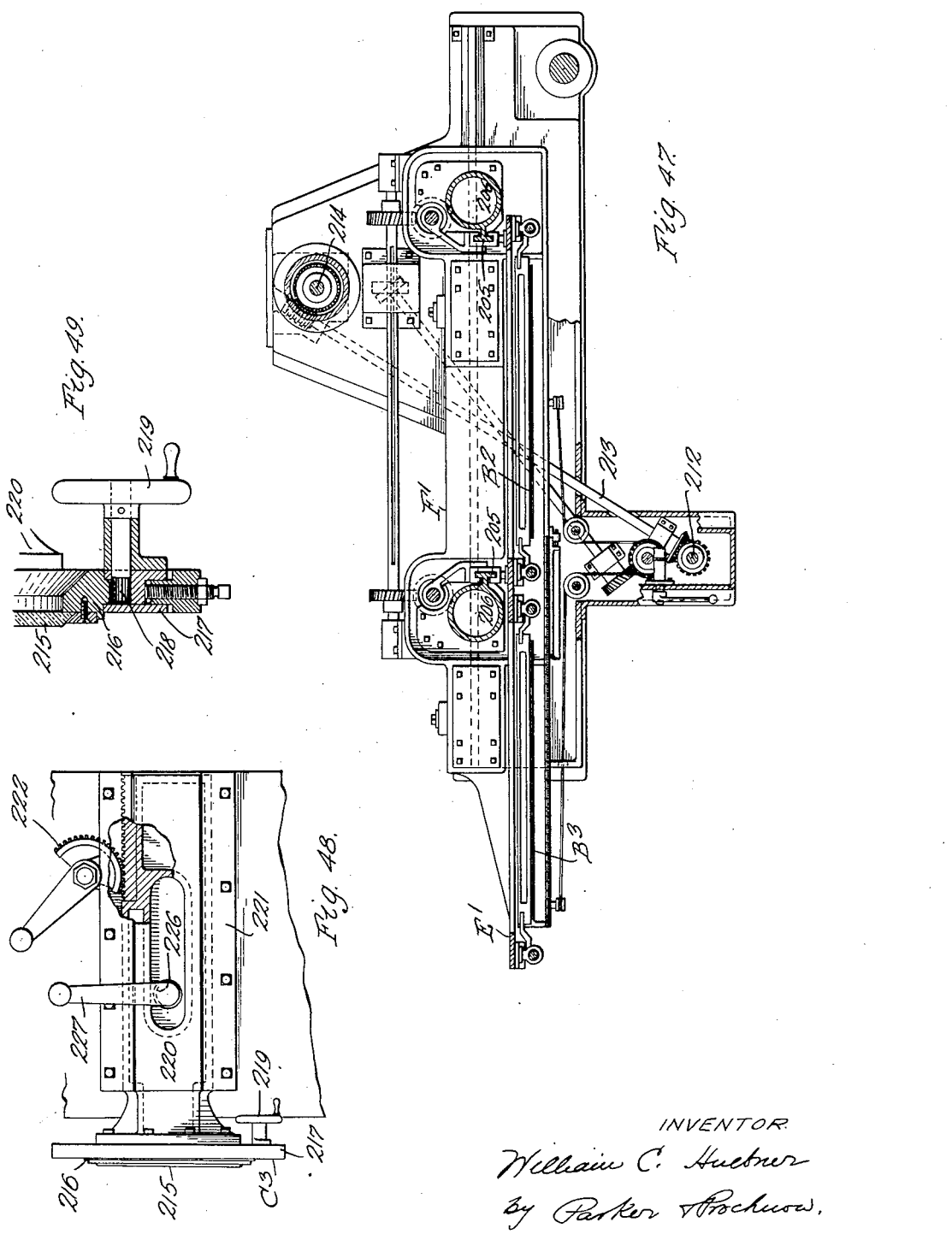

Patented Oct. 28, 1924.

1,513,321

UNITED STATES PATENT OFFICE.

WILLIAM C. HUEBNER, OF BUFFALO, NEW YORK, ASSIGNOR TO HUEBNER BLEISTEIN PATENTS COMPANY, OF BUFFALO, NEW YORK.

PHOTOGRAPHIC-PRINTING APPARATUS.

Application filed October 16, 1920. Serial No. 417,386.

*To all whom it may concern:*

Be it known that I, WILLIAM C. HUEBNER, a citizen of the United States, residing at Buffalo, in the county of Erie and State of New York, have invented a new and useful Improvement in Photographic-Printing Apparatus, of which the following is a specification.

This invention relates more particularly to improvements in photographic printing or composing apparatus of the kind which are intended for photographing any desired number of like or different original prints in any required predetermined and registered position and relative arrangement directly upon the sensitized surfaces of press plates which may be afterwards suitably finished and used in mechanical printing presses for printing in one or more colors. Such apparatus are intended for various purposes, such for instance as repeating prints from the same transparent printing plate or negative in a required arrangement on a single sensitized press plate, which after development, is used for mechanically printing a plurality of impressions; for composing work where it is desired to place different subjects in a predetermined arrangement on the press plate; and for making press plates for multicolor printing where it is necessary to photograph prints in exact register on the different sensitized press plates that are used in presses for printing the different colors.

One object of the invention is to produce a practical and efficient photo composing apparatus of novel construction whereby two press plates can be made at one time by one operator in nearly the same time and with little more labor than heretofore required to produce one plate. Other objects are to produce an apparatus by which two sensitized plates can be printed simultaneously with the several impressions or images on the two plates in exact register with each other; also to provide means whereby a register press plate can be produced by either visual register or micrometer readings or by both methods coordinated so as to serve as a double check up and to furnish a graphical record of position readings in which the exposures are made; also to enable the operator to use a layout sheet, key sheet, printed press sheet, or a stick-up plate such as is used in hand transfer methods, together with a sensitized plate placed in the apparatus side by side facing the operator, and to adjust both together as one unit for positioning the prints on the sensitized plate in accordance with the layout or copy; also to enable the operator to quickly follow up by visual registration, the changed positions of prints on press sheets where the change in position is due to variations in the paper caused by atmospheric changes, and at the same time produce a press plate carrying the succeeding color prints so that they will register with the average changed position of the prints on the printed sheets; also to enable the operator to place a finished press plate in the aparatus and check up the work by either or both visual register and micrometer readings, and at the same time produce another press plate for the same color, or for another color of the same job; also to produce a photographic printing or composing apparatus of improved construction whereby it is possible to secure results, hereinafter explained, which are not possible with apparatus heretofore used; and also to improve photographic printing or composing apparatus in the other respects hereinafter described and set forth in the claims.

In the accompanying drawings:—

Fig. 4 is a longitudinal, central, vertical section thereof, showing one of the printing plate supports swung out to a position to afford access to the printing plate thereon.

Fig. 5 is a fragmentary sectional plan view on an enlarged scale on line 5—5, Fig. 9, showing the guide means for the carrying frame for the sensitized plates.

Figs. 6 and 7 are vertical and horizontal sections respectively, of one of the adjusting nuts for the carrying frame for the sensitized plate.

Fig. 8 is an enlarged fragmentary cross section of one of the attaching and holding bars for the sensitized plates, on line 8—8, Fig. 9.

Fig. 9 is a longitudinal sectional elevation of the apparatus on line 9—9, Fig. 3.

Fig. 10 is a sectional plan view showing the lower portion of the apparatus.

Figs. 11 and 12 are transverse and longitudinal vertical sections respectively, on lines 11—11, Fig. 10 and 12—12, Fig. 11, showing one of the guiding and supporting trucks for the sensitized plate carriage.

Fig. 13 is a fragmentary front elevation partly in section of one of the printing plate supports.

Fig. 14 is a horizontal section thereof on line 14-14, Fig. 13.

Figs. 15 and 16 are fragmentary cross sections thereof on an enlarged scale, on lines 15—15 and 16—16 respectively, Fig. 13.

Fig. 17 is a fragmentary sectional elevation of the apparatus on line 17—17, Fig. 4, looking in the direction of the arrow and showing the vertical adjustment indicating means for the sensitized plate carrying frame.

Fig. 18 is an enlarged sectional plan view thereof on line 18—18, Fig. 17.

Fig. 19 is a fragmentary front elevation of the micrometer scale for indicating the original movements of the sensitized plate carriage.

Fig. 20 is a plan view thereof.

Fig. 21 is a sectional plan view of the means for locking the sensitized plate carriage from movement.

Figs. 22 and 23 are fragmentary front and edge views respectively of the adjusting means for one of the holders for the sensitized plates.

Fig. 24 is a vertical section thereof, on an enlarged scale on line 24—24, Fig. 22.

Fig. 25 is a sectional elevation thereof on line 25—25 Fig. 23.

Figure 2:
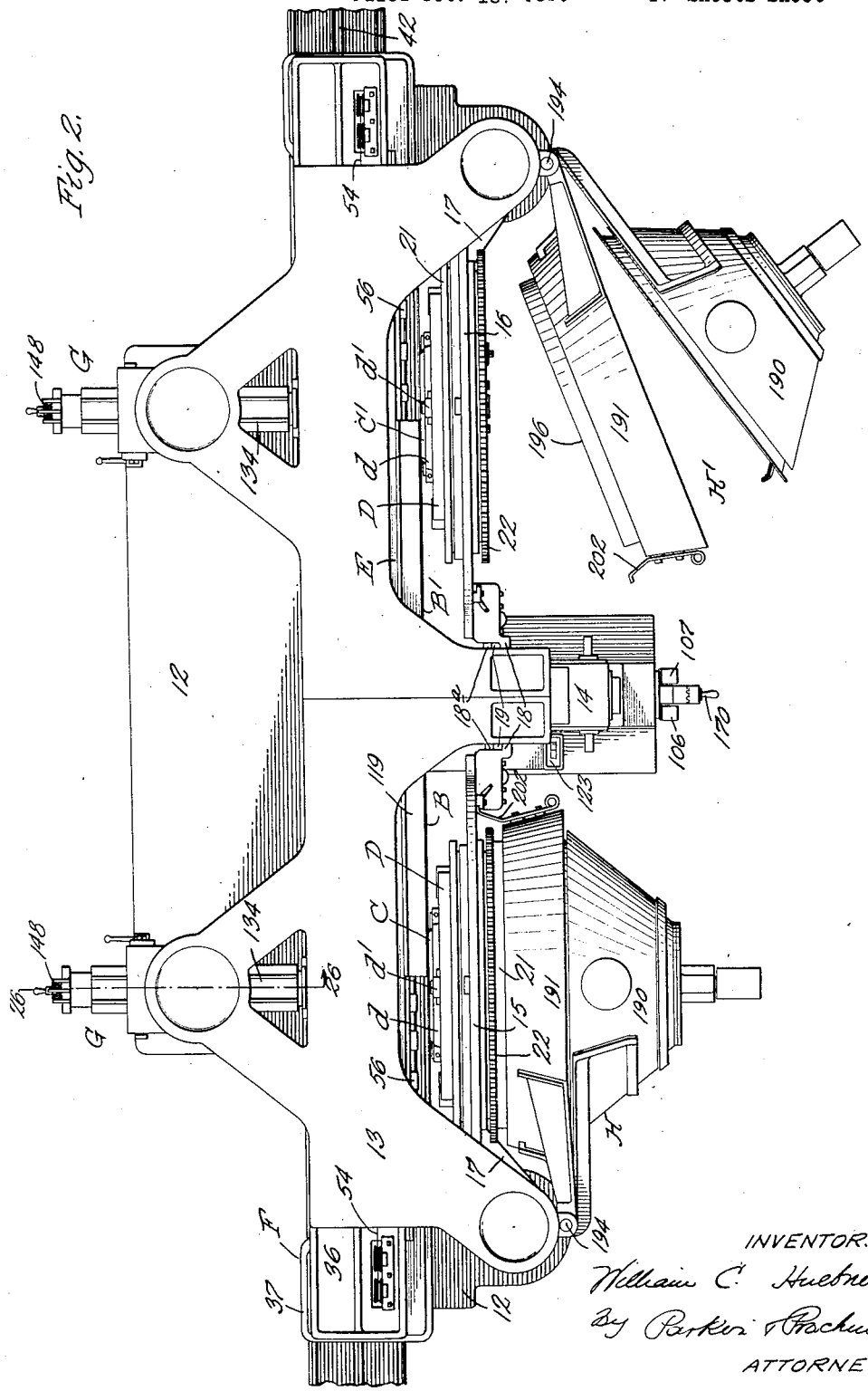
Fig. 2 is a plan view thereof, and showing one of the light chambers in an inoperative position.

Fig. 26 is a fragmentary sectional elevation of one of the pressure devices on line 26—26, Fig. 2.

Fig. 27 is a fragmentary side elevation thereof.

Fig. 28 is a fragmentary rear elevation thereof,

Fig. 29 is a sectional plan view thereof on an enlarged scale on line 29—29, Fig. 26.

Fig. 30 is a sectional elevation thereof on an enlarged scale on line 30—30, Fig. 27.

Fig. 31 is a fragmentary vertical section thereof on line 31—31, Fig. 29.

Fig. 32 is a fragmentary longitudinal sectional elevation, on an enlarged scale, of the operating devices for the horizontal and vertical adjusting mechanism for the sensitized plate support.

Fig. 33 is a fragmentary side elevation partly in section of the actuating mechanism for the pressure devices and the swinging supports for the printing plates.

Fig. 34 is a similar figure showing the parts in another position.

Fig. 35 is a horizontal section thereof on an enlarged scale on line 35—35, Fig. 33.

Figure 1:
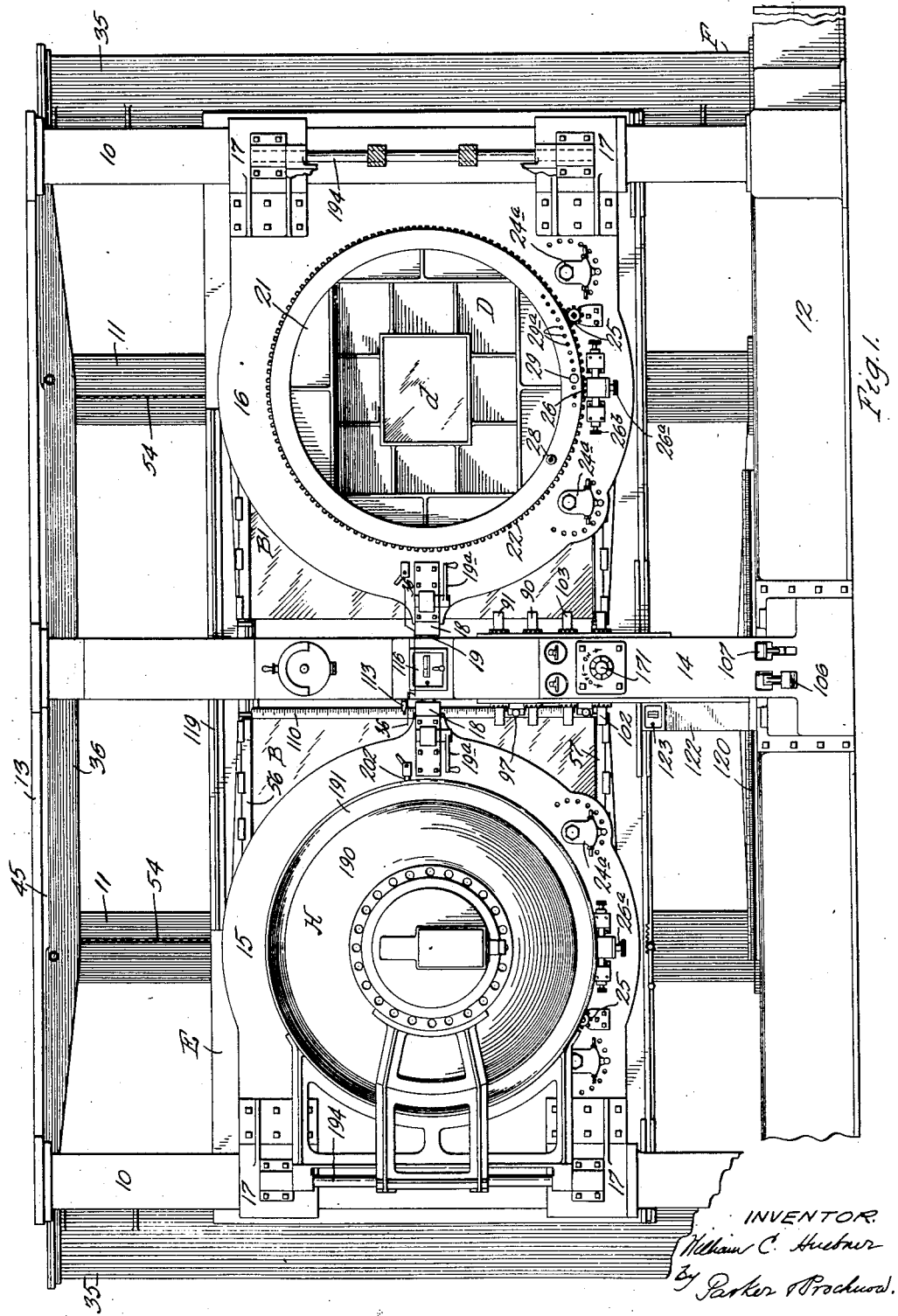
Fig. 1 is a front elevation of a photographic printing apparatus embodying the invention, one of the light chambers being omitted to expose the printing plate support which is located in rear thereof.

Fig. 36 is a sectional plan of the locking means for the printing plate supports on an enlarged scale on line 36—36, Fig. 1.

Fig. 37 is a horizontal section on an enlarged scale showing a portion of the adjusting mechanism for the sensitized plate holders, on line 37—37, Fig. 4.

Fig. 37ª is a perspective view of the coupling ring for the splined gear thereof.

Fig. 38 is a horizontal central section of one of the lamp housings.

Fig. 39 is an elevation thereof, partly in section on line 39—39, Fig. 38.

Fig. 40 is a fragmentary plan view of the locking means for the lamp housing.

Fig. 41 is a fragmentary enlarged section thereof on line 41—41, Fig. 39.

Fig. 42 is a front elevation of a smaller and simplified embodiment of the invention adapted for making one plate at a time.

Fig. 43 is a plan view thereof.

Fig. 44 is an elevation, on an enlarged scale, of the actuating means for the light controller.

Figure 45:
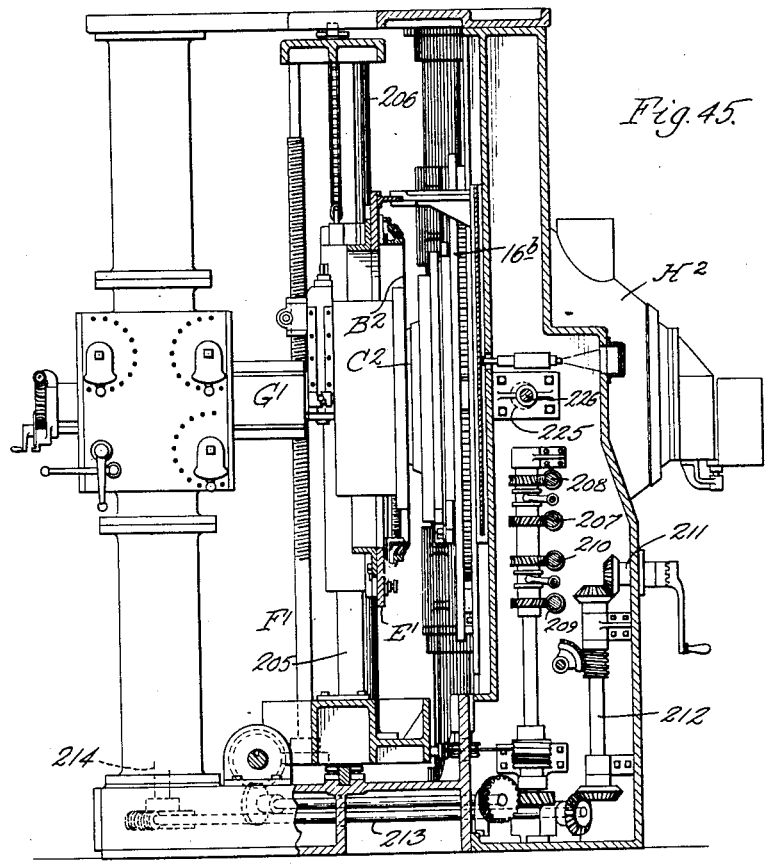

Fig. 45 is a transverse longitudinal sectional elevation of the apparatus on line 45—45, Fig. 43.

Figure 46:
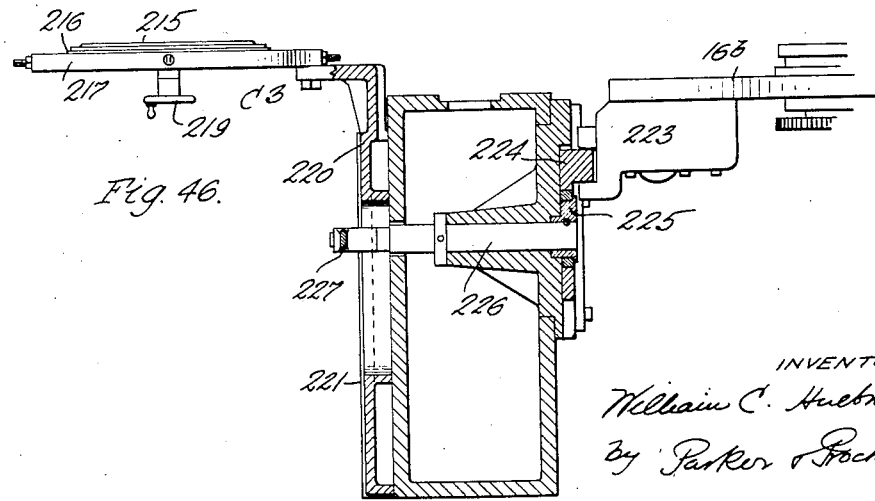

Fig. 46 is an enlarged sectional plan view thereof on line 46—46, Fig. 42.

Fig. 47 is a sectional plan view showing the lower portion of the apparatus.

Fig. 48 is an enlarged side elevation, partly in section of the registering device.

Fig. 49 is an enlarged detail section of the registering device.

An apparatus hereinafter described in detail, comprises, briefly stated, a support on which two sensitized press plates, or a press plate and a layout sheet or other copy may be arranged side by side, preferably in the same vertical plane, and facing the same way, supports or holding a transparent negative or photographic printing plate (hereinater called the printing plate) in front of one of the sensitized plates, and a second printing plate, or a registering device in corresponding relation in front of the other sensitized plate or copy sheet; two pressure devices arranged back of the press plates for causing intimate contact of the sensitized surfaces with the printing plates; means for causing light to act through the printing plate or plates for making photographic prints therefrom on the sensitized plate or plates; adjusting means for producing like relative movements between the sensitized plates and the companion printing plates, or printing plate and registering device, parallel with the surfaces of the sensitized plates, to enable the prints to be made in predetermined locations and positions on a sensitized plate and in exactly corresponding positions on different sensitized plates;

and means for producing a relative movement between the sensitized and printing plates toward and from each other to place the plates into contact for printing and to separate them to enable the necessary relative adjustments of the plates.

The embodiment of the invention illustrated in the drawings is preferably constructed as follows:—

The stationary frame of the machine is composed of two front tubular columns 10 and two rear tubular columns 11, which columns are connected by a base or hollow casting 12 and a top casting or head 13. At the front central portion of the frame between the columns 10 is an upright hollow housing or frame member 14 also connecting the base and the head.

B B' represent two plates arranged vertically side by side and facing forwardly, and C C' represent two plates or members arranged vertically one in front of each of the plates B B'. As will be explained later, both of the plates B B' may be sensitized press plates, or one of them may be a layout or copy plate or sheet, and both of the members C C' may be transparent printing plates, or one of them may be a registering plate or member. For the sake of clearness and brevity of description, the plates B B' will be referred to as sensitized plates and the members C C' as printing plates, until the operation and use of the apparatus is explained hereinafter.

The printing plates C C' are mounted respectively on two swinging supports or frames 15 and 16 which are similar except that they are oppositely arranged. The frame 15 is hinged by lugs 17 on one of the columns 10 and the other frame 16 is similarly hinged on the other column 10. The frames are adapted to swing on the columns to and from operative positions in which they support the printing plates C C' in substantially the same vertical plane respectively in front of the sensitized plates B B'. The swinging frames are adapted to be secured stationarily in this operative position by suitable means preferably comprising a stop 18 and bolt 18ª on each frame adapted to be locked to a keeper 19 movably mounted in the housing 14, (see Figs. 1, 2 and 33 to 36). The keeper 19 projects out of the housing at the sides thereof and the stops 18 are adapted to strike the ends of the keeper to arrest the swinging frames in their operative positions. The frames are then locked to the keeper by projecting the bolts 18ª into engagement with the keeper as shown in Fig. 36. As shown, each bolt is actuated by a crank 19ª having a pinion meshing with a toothed rack on the bolt. The keeper 19 is adapted to be moved a limited distance forwardly and rearwardly as hereinafter explained to move the swinging frames 15 and 16 to carry the printing plates a limited distance from a clearance position out of contact with the sensitized plates, into contact with said plates.

Each of the swinging frames 15 and 16 is provided with a circular opening 20 in which is mounted a rotatable index head 21 which carries a holder D for one of the printing plates. Each index head has an opening 21ª therethrough large enough for the passage of light to illuminate all parts of the largest printing plate for which the machine is adapted. The index head shown, (see Figs. 4 and 13 to 16) consists of a circular frame provided at the outer side of the swinging frame 15 with a gear ring 22, and it is rotatably supported in the opening 20 by rollers 23 and 23ª on which the circular edge of the head 21 bears and is adapted to roll. As shown, the rollers 23 at the lower edge of the index head are journaled in pairs on pivoted rockers 23ᵇ so that these rollers will automatically adjust themselves to the edge of the head, and the rockers are pivoted on eccentrics 24, Fig. 13, which are rotatably adjustable so that the index head can be caused to turn accurately about a predetermined point as a center. The eccentrics 24 are adjusted and secured by devices 24ª constructed as hereinafter explained in connection with like adjusting devices for another purpose. The index head is rotatably adjusted by a pinion 25, Figs. 1 and 13, journaled on the swinging frame and meshing with the gear ring 22. This pinion can be turned, as by a crank applied to the end of its shaft. The index head is preferably locked in adjusted positions by means of a dog 26 on the swinging frame and actuated by a screw 26ª to engage the teeth of the gear ring 22, see Fig. 13. The locking dog 26 is adapted to be adjusted tangentially relatively to the gear ring as by screws 26ᵇ. The index head can be turned approximately to the required position by turning the pinion 25 and can then be accurately adjusted to any required fractional portion of a tooth movement of the gear ring by adjusting the dog 26 tangentially, which fractional adjustment can be indicated by any suitable scale or the like.

In order to enable a limited adjustment of the printing plate C or C' perpendicularly to its face so that the printing faces of different plates which may be of different thicknesses can be located in exactly the same plane, an adjusting ring 27 is provided surrounding the index head in the opening 20 in the swinging frame 16. This ring 27 has a screw threaded engagement 27ª with the index head so that by turning the ring the head can be moved slightly inwardly or outwardly. The adjusting ring can be turned as by a pinion 28, Figs. 14 and 15, meshing with a toothed rack 28ª on the adjusting ring.

This pinion can be turned as by a crank applied to the outer end of its shaft. The adjusting ring is locked when adjusted, preferably by a pin 29, Figs. 1, 13 and 16, adapted to be inserted through one of a series of holes 29ª in the gear ring into a slot in the adjusting ring 27.

Any suitable means may be used for adjustably mounting the printing plates C C' on the plate holders D and securing the holders in the index heads. Each of the plate holders, see Fig. 4, consists of an open rectangular frame carrying a stationary transparent supporting plate $d$ on the face of which the printing plate is adjustably secured by holding devices $d'$ engaging the beveled edges of the printing plate. The plate holder is removably secured on the rear face of the index head over the opening 21ª thereof by means adapted to ensure an accurate positioning of the plate holder. For instance, the plate holder is placed on the index head with three of its edges bearing against stops 30 on the index head and is forced firmly over against these stops and locked on the index head by securing devices 31, 31ª. The construction of the holder D and the means for removably securing it in place on the index head is more fully described in my application for patent, Serial No. 279,493, filed Feb. 27, 1919.

The sensitized plates B B' are supported vertically with their sensitized faces forward on a carrying frame E arranged to move vertically parallel with the plane of the sensitized plate on a main carriage F which, in turn, is movable horizontally parallel with the faces of the sensitized plates on the stationary frame of the machine. The carriage F is preferably formed by upright tubular end posts 35 connected at their upper and lower ends by top and bottom castings 36 and 37 respectively.

The carriage F is preferably supported and guided as follows, see Figs. 4 and 9–12;

The carriage is supported by wheeled trucks 40 at its bottom having wheels 41 arranged to roll on a horizontal guide rail 42 on the base of the machine and having side guide rollers 43 which engage opposite sides of the rail 42. At its top the carriage is provided with guide rollers 44 arranged to engage opposite sides of an upper horizontal guide rail 45 on the head of the main frame. The rollers 41 support the carriage in its horizontal travel and the upper and lower guide rollers prevent the carriage from shifting forwardly or rearwardly on the guide rails out of its intended vertical plane of movement. In order to level the carriage and ensure of its moving in a truly horizontal path, the wheeled trucks 40 are separately adjustable vertically, for which purpose each truck is pivoted between its ends on an eccentric 46, Figs. 11 and 12, on a shaft 47 which is journaled to rock in suitable bearings on the carriage F. The trucks are adjusted vertically by turning the eccentric shafts by means of adjusting and securing devices 48 at the outer ends of the shafts, similar to the eccentric adjusting devices 24ª.

The vertically adjustable carrying frame E preferably consists of an open rectangular casting having top and bottom horizontal bars connected by upright end and intermediate bars. This frame is mounted to slide vertically on the end posts of the carriage F preferably as follows: The posts are provided with T-shaped guide rails 51, Fig. 10, entering correspondingly shaped grooves in guide bars 51ª secured to the ends of the carrying frame E. These guide bars are attached to the corners of the carrying frame by bolts 52 at the ends of the bars. The two lower bolts are permitted a slight lateral play in the carrying frame, while one of the upper bolts is tight in the frame, and the remaining bolt is secured in a block 52ª, Fig. 9, slidable horizontally in the frame. By this construction the guide bars have a slight play relatively to the carrying frame which ensures free movement of the frame in a true vertical direction, notwithstanding possible irregularities in or non-parallelism of the guide rails 51. The frame is preferably connected to counterbalancing weights 53 arranged to move vertically in the end posts 35 of the carriage F and connected by chains or cables 54 to the carrying frame. These cables pass around pulleys preferably arranged as shown in Fig. 9, on the weights and on the carriage.

The sensitized plates B B' can be mounted on the carrying frame E in any suitable way adapted to hold them smooth and taut in predetermined required positions on the frame. As shown, see Figs. 4, 8 and 9, each sensitized plate has secured to its upper and lower edges attaching bars 55 adapted to be removably seated in recesses in upper and lower holding bars 56 and 57 on the carrying frame E. The attaching bars 55 are adapted to be inserted into the recesses in the holding bars 56 and 57 and then turned to the position shown in Fig. 8, in which the inner edges of the attaching bars seat in retaining grooves 58 in the holding bars, the attaching bars being held in the retaining grooves by the tension on the sensitized plate when it is stretched taut. The attaching bars 55 are adapted to be moved endwise in their seats firmly against one end of the seats by screws 57ª or the like, Fig. 9, at the opposite ends of the bars. This construction enables the sensitized plates to be quickly secured in the carrying frame always in the same predetermined position. The upper holding bars 56 shown are stationarily secured on the carrying frame, while the lower holding bars 57 are adjustable vertically on the carrying frame to suit sensitized plates of different widths and for drawing the plates taut, preferably as follows: Each lower holding bar 57, see Figs. 9 and 22 to 25, is provided at its opposite ends with guide shoes 58ª arranged to slide in vertical guide ways 59 in the carrying frame and is adjusted by vertical screws 60 mounted on the carrying frame at the ends of the holding bar. The upper end of each screw is adapted to slide vertically and turn in a bearing 61 on the carrying frame and its lower end is journaled in and held from endwise movement in a bushing 62 which is provided exteriorly with a screw thread adapted to turn in a threaded hole 63 in an adjusting block 64 also arranged to slide in one of the vertical guide ways 59. Each block 64 is provided with a recess in which works an eccentric 65 and eccentric block 66. The eccentric is journaled in the carrying frame and provided with a pinion 67 for turning it. The pinions for the four eccentrics for the two holding bars 57 mesh with teeth on a rack bar 68, Fig. 9, arranged to move horizontally endwise in suitable guides on the carrying frame E. By moving this bar the several eccentrics 65 are rotated and the adjusting blocks 64 moved to effect a quick, simultaneous movement of both holding bars 57. This rack bar 68 can be moved for this purpose by any suitable means, such as a crank 69 provided with a pinion meshing with teeth on the rack bar. When the blocks 64 are moved they move the screws 60 and holding bars bodily on the carrying frame. This movement is for the purpose of slackening the sensitized plates to enable the attaching bars 55 on the edges of the sensitized plates to be quickly engaged with and disengaged from the holding bars. The lower holding bars can be adjusted vertically to the proper position for engagement with sensitized plates of different widths by turning the screws 60 in the bushings 62. When the screws are thus turned their engagement with the threaded holes in the holding bars move the latter on the screws. After the holding bars have been thus moved approximately to the required position, a finer and more accurate adjustment can be effected for ensuring that the sensitized plates will be made taut and smooth by turning the screw bushings 62 in the adjusting blocks 64. The screws and bushings can be turned by any suitable means, such as ratchet handles 70 on the lower ends of the screws and ratchet handles 70ª on the screw bushings 62.

Since the sensitized plates B B' are both mounted on the same carrying frame E in like relation to the two printing plates C C', any adjustment of the carrying frame vertically and any adjustment of the carriage F horizontally will result in moving both sensitized plates simultaneously either vertically or horizontally precisely the same distance and secure precisely corresponding positions of the two sensitized plates relatively to their related printing plates.

The following mechanism is shown for adjusting the carrying frame E vertically:

A horizontal shaft 71, Figs. 4 and 10, is suitably journaled on the lower portion of the carriage F and is connected by spiral gears 72 at its ends to two upright screw shafts 73 suitably journaled on the ends of the carriage F. These screw shafts turn in threaded nuts 74 attached to the opposite ends of the carrying frame E so that when the shaft 71 is rotated in one or the other direction, it will turn the two screw shafts and move the carrying frame up or down. Each nut 74, see Figs. 6 and 7, is preferably journaled in a bearing bracket 74ª attached to the carrying frame, and adapted to be turned in this bearing by a worm 74ᵇ journaled in the bracket and engaging a worm wheel on the nut. By turning the nuts on the screw shafts by means of the worms, the carrying frame can be set accurately in a horizontal position. The worms hold the nuts where adjusted. The shaft 71 is connected by spiral or other suitable gears 75 and 76 to a shaft 77 extending to the front of the machine and there connected by spiral or other suitable gears 78 and 79 to an upright shaft 80. The gear wheel 75 is suitably splined on the shaft 71 so that this shaft can move horizontally with the carriage F while the gear wheel 75 can remain in mesh with the gear wheel 76. In order to ensure freedom of movement of the shaft 71 through the gear 75 and prevent binding of the same in the gear wheel due to a possible misalinement or irregularity in the shaft, the gear wheel 75, as shown in Fig. 37, is preferably journaled at opposite ends of its hub in bearings 81 in a bracket or housing 82 secured to the carriage F and the shaft 71 passes freely through the central opening of the hub of the wheel 75. Surrounding the shaft 71 within a central cavity in the hub of the wheel 75 is a collar 83 which is splined on the shaft 71. This collar is loose in the cavity in the wheel and is permitted limited free movement therein both endwise and laterally. Between one end of the collar and the adjacent end of the hub of the wheel 75 is a coupling ring 84 which has a tooth and socket connection 85 with the collar 83 and a tooth and socket connection 86 with the hub of the wheel 75. The teeth 85 and 86 are arranged in planes at right angles to each other so that the coupling ring can slip in one direction, say horizontally relatively to the wheel 75, and in a different direction, say vertically relatively to the collar 83, thus permitting a more or less universal lateral movement of the shaft 71 within the wheel 75, while always causing the wheel to turn positively with the shaft.

The upright shaft 80, see Figs. 4 and 32, is suitably journaled in the housing 14 of the frame and is adapted to be turned by either of two horizontal operating shafts 90 and 91 which are journaled in and extend longitudinally of the machine through the housing 14. The shaft 90 is connected by gear wheels 92 and 93, preferably spiral gears, to the shaft 80, so that by turning the shaft 90 a coarse or quick adjustment of the carrying frame E is produced. The shaft 91 is provided with a worm 94 meshing with a worm wheel 95 loose on the shaft 80. Between the wheels 93 and 95 is a sliding clutch collar 96 provided at its lower end with teeth entering sockets in the wheel 93 and at its upper end with teeth adapted to engage teeth on the worm wheel 95. In the normal lowered position of the clutch collar 96 the worm wheel 95 is disengaged and the shaft 80 can then be turned by rotating the shaft 90. By shifting the collar 96 into engagement with the worm wheel 95, by a lever or other shifting device 97, the worm wheel 95 is coupled to the wheel 93 through the medium of the clutch collar, and the shaft 80 can then be rotated slowly to effect a fine, accurate adjustment of the carrying frame by turning the other operating shaft 91.

The following mechanism is shown for adjusting the carriage F horizontally.

98 represents a hollow shaft which surrounds and is suitably journaled on the upright shaft 80. This shaft is provided at its lower end with a drum 99 around which is coiled a flexible band 100 which is fastened at its opposite ends to the opposite end portions of the carriage F. This band is guided around suitable pulleys 101 in the frame housing 14. When the hollow shaft 98 and drum 99 are rotated in one direction, one end of the band will be wound thereon and the other unwound, thus moving the carriage in one direction. The opposite rotation of the drum will similarly effect an opposite movement of the carriage. The hollow shaft 98 is preferably adapted to be rotated by either of two operating shafts 102 or 103 connected to the shaft 98 in a manner similar to the connection of the shafts 90 and 91 with the shaft 80, so as to enable a coarse or a fine adjustment of the carriage F.

The four operating shafts 90, 91, 102 and 103 for the carrying frame E and the carriage F preferably extend out of the housing 14 at opposite sides thereof and are adapted to be operated by a suitable crank or handle applied to either end of each shaft. This arrangement makes it convenient for an operative standing in front of the printing plate at either side of the center of the machine to readily make the desired adjustments of the carrying frame E and the carriage F while remaining in front of the printing plate where he can readily observe the registration of the printing plate with the sensitized plate.

104, Figs. 4, 21 and 32, represents a device for locking the carriage F after adjustment to prevent accidental movement and misadjustment of the carriage. This locking device, as shown, consists of a split brake band encircling the hub of the drum 99 and adapted to be contracted thereon to hold the shaft 98 from rotation. A shaft 105 extends through the ends of the band 104 having a screw threaded engagement with one of said ends and passing loosely through the other end of the band. Secured to the shaft 105 at one end is a treadle 106 which extends out through an opening in the front of the frame housing 14, so that the operative can depress the same with his foot. When this treadle is depressed the shaft 105 is turned and the screw connection between the same and the brake band 104 contracts the band on the drum 99. As long as the treadle 106 remains depressed the shaft 98 will be locked from rotation. 107 represents a second, or releasing treadle. This treadle is loosely pivoted on the shaft 105 and is attached to one end of a chain 108 which passes over a sprocket wheel 109 journaled in the housing 14 and is attached at its opposite end to the locking treadle 106. When the treadle 107 is depressed it will raise the locking treadle 106 and rock the shaft 105 in the opposite direction, thereby expanding the locking band and freeing the shaft 98.

The vertical adjustment of the carrying frame E is preferably indicated by a graduated scale 110, Figs. 1, 17 and 18, which is secured to a slide 111 arranged to slide in a vertical guide way 112 in the rear face of the frame housing 14. The scale bar is located where it can be seen at one side of the frame housing 14, and a cooperating pointer 113 secured to the housing indicates the adjustment. The graduations of the scale 110 are comparatively coarse and this indicator shows the adjustment only coarsely. An accurate micrometer reading is secured by providing the slide 111 with a graduated transparent scale 114 arranged to move vertically in rear of a microscope 115 which is arranged in the housing 14 in rear of a window or ground glass 116. The transparent scale is graduated in thousandths of an inch or other very fine divisions and an enlarged image of these, projected by the microscope on the glass 116, can be readily seen and read. The transparent scale is illuminated by a suitable lamp 117 located in rear of the scale and the microscope. The slide carrying the scale bars is provided at its upper end with a rearward projection 118 provided with a horizontal slot into which extends a horizontal bar 119 projecting forwardly from the upper portion of the carrying frame, see Fig. 4. When the carriage F is moved horizontally this bar 119 slides transversely in the projection 118 and maintains the connection between the scale slide and the carrying frame in the various horizontal movements of the carriage F.

The horizontal adjustments of the carriage F are indicated preferably in a similar manner by a coarsely graduated scale 120, Figs. 1 and 4 and 9, secured to the lower portion of the carriage F and cooperating with a suitable pointer. A transparent scale bar 121 having fine graduations is also secured to the carriage and adapted to move past a microscope 122 preferably arranged in an inclined position at one side of the frame housing to project an enlarged image of the graduations on a window or ground glass plate 123. The transparent scale is fixed on a supporting bar 124 and is adjusted accurately endwise by end screws 125, Figs. 19 and 20, and is leveled and clamped tightly in adjusted position by screws 126 and 127. The transparent scale, like the vertical scale, is illuminated by a suitable lamp 125ª.

G G represent two pressure devices for pressing the sensitized plates into firm contact with the printing plates. These pressure devices are mounted on the two rear columns 11 of the machine frame in rear of the sensitized plates and each pressure device, see Figs. 26-31, comprises a pressure block 130 which is faced with suitable material adapted to engage the rear face of the companion sensitized plate and is preferably removably and adjustably mounted as follows: The head is removably secured and adapted to be turned on a stud 131ª on a slide 131 which is adjusted radially by a screw 131ᵇ on a head 132 secured to the inner end of a shaft 133 which is journaled to rotate and is held from endwise movement in a carriage 134. This carriage is movable toward and from the sensitized plate in a support 135, preferably in the form of a hollow housing forming a part of one of the columns 11. The carriage is provided at its top and bottom with parallel angular guide rails 136 arranged to travel on four rollers 137 in the front portion of the housing 135 and four rollers 138 in the rear portion of the housing. These rollers are mounted in pairs on transverse shafts 139 and 139ª journaled in the housing 135. The carriage 134 moves freely on the rollers and the angular guide rails cooperating with the rollers accurately guide the pressure carriage 134 and prevent both vertical and lateral play or misalinement of the same. In order that the face of the pressure block may be set accurately in and retained in a plane parallel with the sensitized plate in the adjustments of the pressure head, three of the roller shafts 139 are provided with eccentrics 140 seated in circular bearing holes in the walls of the housing 135, so that by turning the shafts the eccentrics will adjust the shafts and rollers vertically. By thus adjusting the shafts, the carriage can be tipped as may be necessary to set the face of the pressure block in exact parallelism with the sensitized plate. A very fine adjustment of the eccentrics and their shafts 139 is secured by fixing on the end of each shaft an arm 140ª which is held between two adjusting screws 141 on an adjusting member 142 which is mounted to turn loosely on the end of the roller shaft. This adjusting member is provided with a screw pin 143 adapted to enter any one of a circular series of holes 144 in the housing 135. The roller shaft can be adjusted approximately to the required position by moving and securing the adjusting member 142, and a more accurate adjustment is then accomplished by means of the adjusting screws 141. The eccentric adjusting devices 24ª and 48 before mentioned, are preferably constructed in the same way.

The carriage 134 is moved toward and from the sensitized plate as by a pinion 145 on the roller shaft 139ª and engaging rack teeth on the carriage 134. The pinion can be turned by any suitable means, such as a crank or handle 146 on one end of the shaft 139ª. By turning this crank the pressure block can be moved quickly any desired distance toward and from the sensitized plate. The shaft 133 is turned for rotatably adjusting the presure block preferably by a worm wheel 147 on the outer end of the shaft and engaged by a worm 148 journaled on the end of the carriage 134 and adapted to be turned by a handle 149 or other means. The rotary adjustment can be indicated by scale graduations on the worm wheel co-operating with a suitable relatively stationary pointer 150. In addition to this rotary adjustment of the pressure head concentrically with the shaft 133, the pressure block can also be turned to different positions on the stud on the radially adjustable slide 131. The pressure block thus can be adjusted radially to any desired location relatively to the supporting shaft 133 and turned to different positions by turning the shaft 133, and in addition it can be turned to different angular positions on the radially adjustable slide 131, thereby enabling the block to be located opposite any desired portion of the sensitized plate and turned to any required angular position in this location.

In addition to the movement of the pressure block by the pinion 145, the block is also adapted to be moved a short distance for placing it into and out of contact with the sensitized plate and for pressing the sensitized plate against the printing plate. For this purpose a slide 151 is mounted to move toward and from the sensitized plate on suitable guides 152, Fig. 29, in the housing 135. This slide is actuated by an eccentric 153 and eccentric block 154 in an opening in the slide 151. The eccentric is secured on the upper end of an upright shaft 155 suitably journaled in the column 11. A bolt or latch of any suitable sort connects the slide 151 to the carriage 134. The bolt 156 shown, slides in a vertical hole in the slide 151 and is adapted to be moved into engagement with a movable keeper 157 on the carriage 134. The keeper 157 is slidable in a recess in the carriage 134 and is adapted to be moved therein by a screw shaft 158 journaled on the carriage 134 and turning in a threaded hole of the keeper and provided at its outer end with a crank or the like 159 for turning the screw shaft. The bolt 156 can be moved into and out of engagement with the nut 157 by any suitable means such as a crank or handle 160, on the shaft of which is a pinion 161 meshing with rack teeth on the bolt. If the eccentric 153 is turned when the bolt 156 is in engagement with the keeper 157, the pressure block will be moved a distance corresponding to the throw of the eccentric. By turning the screw shaft 158 when the keeper is in engagement with the bolt 156, the carriage 134 will be moved relatively to the keeper, thus enabling the face of the pressure block to be accurately set so as to bear against the sensitized plate and force the same with the required pressure against the printing plate by the operation of the eccentric 153, which always produces the same throw of the pressure block. The eccentrics 153 for the two pressure heads are turned simultaneously by a common mechanism and produce like movements or throws of the pressure blocks, but by the adjustment of the pressure blocks by means of the keepers 157 and screw shafts 158, the positions and pressures of the two pressure blocks can be independently regulated as required.

Figure 3:
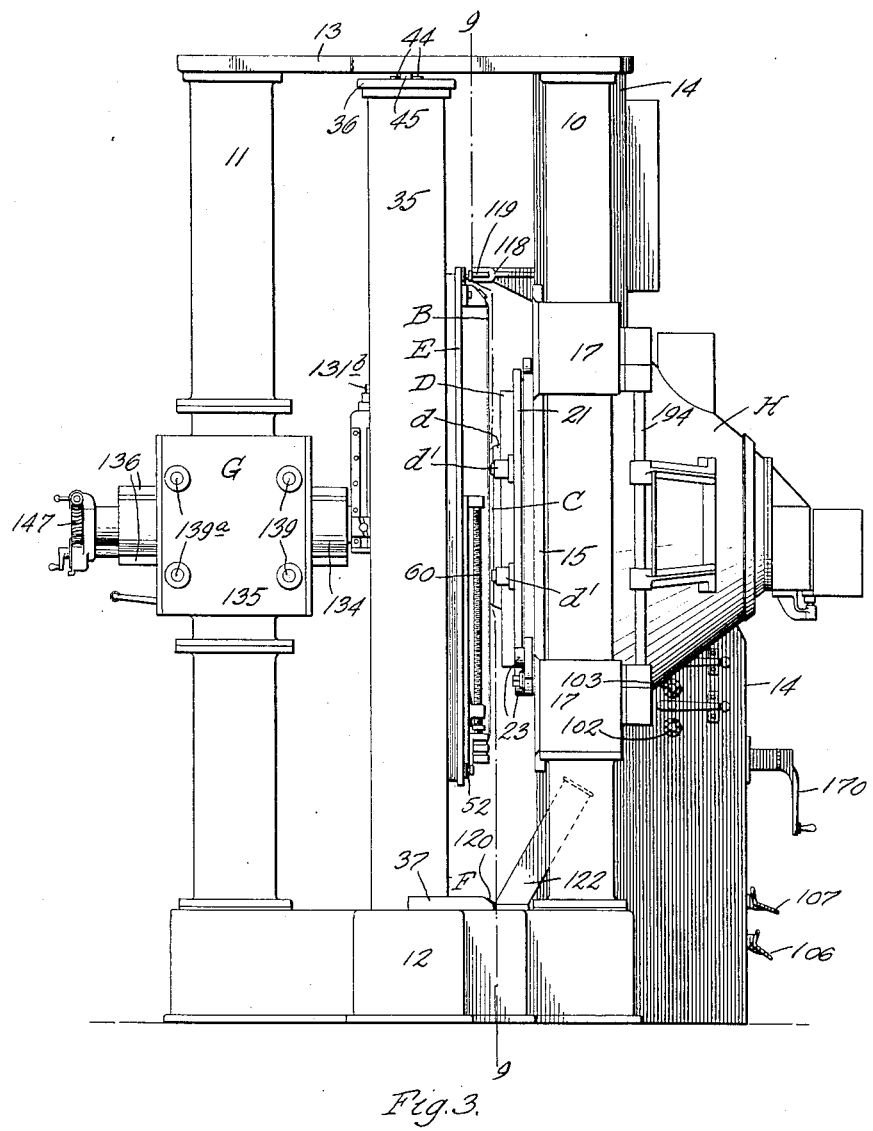
Fig. 3 is a side elevation thereof.

The following mechanism is preferably employed for simultaneously operating the two pressure devices:

170, Figs. 3 and 4, represents an operating crank or device for the pressure devices. This crank is applied to the outer end of a short, horizontal shaft 171 which is suitably journaled in the frame housing 14 and is connected by bevel gears 172 to an upright shaft 173 which is connected at its lower end by bevel gears 174 to a shaft 175 which extends rearwardly in the base of the frame and is connected at its rear end by a worm 176 and worm wheel 177 to a shaft 178 which extends longitudinally in the rear portion of the machine base and is connected at its opposite ends by bevel gears 179 to the eccentric shafts 155 of the two pressure devices.

The operating crank 170 is also utilized for moving the swinging frames 15 and 16 to place the printing plates into and out of contact with the sensitized plates in the following manner:—

The upright shaft 173, see Figs. 4 and 33 to 36, is provided with a worm 180 which meshes with a toothed segment on one end of a lever 181 pivoted in the frame housing 14. This lever is provided at its opposite end with a second toothed segment 182 which is adapted to engage and turn a pinion 183 journaled in the frame housing 14 and connected by bevel gears 184 to an upright shaft 185 also journaled in the housing. This shaft is provided at its upper end with an eccentric 186 for actuating the keeper or stop 19, to which the swinging supports 15 and 16 for the printing plates are adapted to be locked. When the eccentric is turned, the keeper 19 is moved in or out to move the printing plates into and out of contact with the sensitized plate. The arrangement of the lever 181 is such that during the first portion of the operation of the crank 170 the lever will be actuated by the worm 180 and will actuate the eccentric 186 to move the printing plates into contact with the sensitized plates. After a predetermined movement of the crank 170 the segment 182 of the lever 181 moves out of mesh with the pinion 183 and during the continued movement of the crank 170 the pressure blocks will be actuated as above explained without further movement of the printing plate supports. 187, Fig. 24 represents a lever or device which is actuated for turning on the light to make the exposure after the sensitized and printing plates have been pressed into contact. This light control device is conveniently actuated by the lever 181 to which it is connected by a link 188 having a lost motion connection so that the light is not turned on until after the actuation of the pressure device.

For illuminating the printing plates to make the prints, electric arc lamps or other suitable sources of light are preferably provided in light housings or chambers H and H' normally located in front of the swinging supports 15 and 16 for the printing plates. In order to enable the light housings to be moved away from in front of the printing plate supports to afford access to the printing plates, the light chambers are preferably hinged to the companion swinging supports 15, 16 to swing forwardly and rearwardly thereon. In the preferred construction of the light chambers shown, each is composed of two sections 190 and 191 which are hinged so that the chamber as a whole can be swung away from in front of the printing plate support to give access to the printing plate and so that the two sections of the light chamber can be swung apart as shown in Fig. 2 to afford access to the lamp 192 and a glass heat screen 193, which are mounted respectively in the chamber sections 190 and 191. As shown, the two chamber sections are independently hinged to a rod 194 on the related swinging frame 15 or 16. The lamp section 190 is composed of two frusto-conical walls separated by a space 195 through which air circulates for cooling the walls. The section 191 is composed of three concentric spaced wall rings 196, 197 and 198 arranged and connected as shown. The screen which is formed by spaced parallel glass plates is secured in the central ring 196 and this ring has holes 199 therein allowing the circulation of air between the glasses to protect the screen and the printing plate from the heat from the lamp. The section 190 of the chamber projects loosely into the other section 191, and the central ring 196 projects into the circular opening of the adjacent registering head 21, while the inner ends of the spaces between the three rings of the section 191 are closed by an end plate 200. Leakage of light from the lamp chamber is thus effectually prevented while permitting free circulation of air through the chamber. The two sections of the casing are releasably secured together by a latch 201 of any suitable sort and the light chamber is releasably secured to the swinging frame 15 or 16 in operative position in front of the printing plate by a latch 202 of any suitable kind.

As above described, the apparatus is adapted to be used to produce two press plates simultaneously from two similar or dissimilar printing plates and the successive prints will occupy exactly corresponding positions on both sensitized plates. This enables, for instance, the rapid production of the several plates necessary for the different colors of a multi-color job. It is at times necessary, however, to produce a press plate from a layout sheet, key sheet, printed press sheet or a "stick-up" plate such as is used in hand transfer methods. In such case the layout sheet or other copy may be secured on the carrying frame E in place of one of the sensitized plates B', the layout sheet and the sensitized plate being secured on the frame in corresponding positions. Then by adjusting the carrying frame E so as to cause one of the images or register marks on the layout sheet or copy to register with the printing plate C' or a registering plate or device on the companion printing plate holder, the sensitized plate B will be correspondingly positioned, and a print can be made thereon from the printing plate C exactly in the position required by the layout or copy.

Since the printing plate is transparent, a visual registration with the image or marks on the copy sheet can be quickly and easily obtained. Manifestly a special transparent registering plate or other suitable registering device substituted in place of the printing plate on one of the printing plate supports 15 or 16, or similarly arranged, could be used in a like manner for obtaining registration.

The construction described enables the operator to adjust a layout sheet in register with a visual indicator. The sensitized plate B will occupy the same relative position opposite the printing plate C to be exposed, and during the exposure period, the operator can read the micrometer scales, which indicate in thousandths of an inch the position, both vertically and horizontally, occupied by the print being exposed, and he can copy these readings on a small layout sheet which can be used for succeeding prints. In such case the visual register sheet can be dispensed with for succeeding colors of the same job, as micrometer register can be more speedily obtained than visual register, providing duplicate registrations are required.

When a printed press sheet is used as a guide to duplicate exactly the locations of the prints on the press sheet, it is necessary to locate the subjects in definite relation to the gripper and side guide portions of the plate so that the new plate can be placed on the cylinder of a printing press in the required position for register. The operator therefore, places the printed sheet exactly in the required position on a supporting plate in the carrying frame E and uses the transparent printing plate or visual registering device in the manner explained. By this means the operator is enabled to produce a duplicate register press plate with all of the prints placed exactly in the same relative positions as on the printed sheet. He can thus duplicate a job on which a reprint edition is required, or a job which has been hand-transferred for some colors and it is desired to produce photo-composed press prints of other colors to complete the work. Thus results are obtained quickly and easily, which could not otherwise be done as accurately and economically.

When it is required to produce a set of register color prints from a layout sheet on which the position of the various prints are indicated by center lines crossing each other at right angles, the following steps are taken:—The layout sheet is mounted upon a supporting metal plate and placed in the photo-composing apparatus. Alongside of the layout sheet is mounted a sensitized metal plate. Opposite the metal plate and facing it is mounted the negative which is to be exposed. When the register indicator is in register with the center lines for one position on the layout sheet, the negative is exposed to the sensitized metal plate, and during exposure the vertical and horizontal readings are copied upon a small layout sheet. This operation is repeated until the plate has been exposed for the number of positions required by the layout sheet. In this way the exact register readings for the layout sheet is obtained and at the same time a press plate is produced for the first color. On the succeeding colors the layout sheet is dispensed with and two sensitized metal plates are placed in the apparatus and two negatives of other colors are exposed to the same position readings obtained by the visual registration of the first plate.

This is also a convenient method for registering complicated label or inset subjects as time is saved in speedily adjusting to the space which is to carry the insert to register with the visual register indicator.

When it is desired to check up a metal plate with an image to "image check up," then a negative or positive is mounted upon the index head facing the metal plate to be checked. The metal plate can then be adjusted to the various position readings and the negative or positive can be adjusted to contact with the surface of the metal plate. Thus the two images can be seen and any discrepancy in register can be quickly detected, and the metal plate can be further adjusted until it is in exact register and the correct reading so obtained will be an exact guide for making further duplicate plates of the one so checked up.

Two index heads or negative carriers are provided, either of which or both can be used for registering or checking up work, as well as for photo-composing purposes. The index heads are used particularly where rotary adjustments are necessary for accurate work.

The layout or other copy sheet may be replaced by a transparent negative or positive with duplicate images which are to be followed for register with the visual registering device. In such case the plate would be illuminated from the back so that all of the images would be clearly visible under the registering device. By adjusting the carrying frame E so as to cause one of the images or register marks in the layout sheet or copy to register with a registering device or printing plate on the companion printing plate holder, the sensitized plate on the other portion of the carrying frame E will be correspondingly positioned, and a print can be made thereon from the printing plate C exactly in position required by the layout or copy.

The machine constructed as above described is adapted either for printing simultaneously from two printing plates, or for making prints from a single plate in positions corresponding exactly with a given layout or copy, and by means of visual registration. In cases where it is required to make only one print at a time but secure the facilities of registration and other advantages recited, the machine can be made smaller and lighter by dispensing with one printing plate holder, one pressure device and one light chamber, and simplifying the operating mechanism accordingly. Such a simplified construction is shown in Figs. 42–49.

In this modification of the invention, the general arrangement and operation of the parts is substantially the same as before described. A sensitized plate $B^2$ and a layout sheet or copy $B^3$ are mounted side by side and secured and adjusted as described on a carrying frame $E'$ which is movable vertically in a horizontally movable carriage $F'$. $C^2$ is the printing plate mounted and adjusted in front of the sensitized plate in a swinging frame $16^b$ in the manner described. Instead of the second printing plate and its support, a registering device $C^3$ is employed, the printing plate and registering device occupying corresponding positions in front of the sensitized plate and copy sheet respectively. $G'$ is the pressure device and $H^2$ the light chamber similar respectively in construction and operation to the corresponding devices in the machine first described.

The carriage $F'$ is much shorter than in the other machine and one end of the carrying frame $E'$ overhangs or projects beyond the end of the carriage as shown in Fig. 47, the carrying frame being, however, arranged to slide vertically on guides 205 such as described, on the end posts 206 of the carriage. The carrying frame and carriage are moved by quick and fine adjusting mechanisms constructed substantially as before explained. 207 and 208 indicate the coarse and fine adjustment operating shafts for the carrying frame, and 209 and 210 are the corresponding operating shafts for the carriage $F'$. 211 is the operating shaft for the pressure device $G'$. The shaft 211 is geared to an upright shaft 212 which is geared at its lower end to a horizontal shaft 213 which, since there is only one pressure device $G'$, extends obliquely directly to and is geared to the eccentric shaft 214 of the pressure device.

The registering devices $C^3$ shown consists of a glass plate 215 provided with cross marks adapted to register with register marks on the copy sheet and secured in a circular ring 216 rotatably mounted in a circular holder 217. The ring is adapted to be rotatably adjusted in the holder by a pinion 218, Fig. 49, meshing with teeth on the ring and operated by a crank 219, or by other suitable means. The holder 217 is secured to a slide 220 arranged to be moved toward and from the copy sheet in a suitable guide 221 on the machine frame by a crank operated gear segment 222 meshing with rack teeth on the slide, see Fig. 48. The registering device can be moved close to the copy sheet and then turned as required to register with the marks on the copy. Prints can be made on the sensitized plate in positions corresponding exactly with the requirements of the copy by adjusting the carrying frame in the same manner as in the first machine, the registrations being obtained visually by means of the registering device C².

223 represents the lock for the swinging support 16ᵇ for the printing plate, and 224 the keeper therefor, which is actuated by an eccentric 225 to move the printing plate to and from contact with the sensitized plate. In this construction the eccentric is secured directly to an operating shaft 226 provided with a crank 227 for turning it.

228, Fig. 44, represents the operating device of the light controller. This is actuated to turn the light on or off by a lost motion connection 229 with a gear segment 230 actuated by a worm on the upright shaft 212 of the operating mechanism for the pressure device.

Further description of the construction and operation of this modified machine is considered unnecessary in view of its similarity to the construction first described.

I claim as my invention:—

1. In a photographic printing apparatus, the combination of a common support on which a sensitized plate and another plate are mounted side by side in corresponding positions facing the same way, means for supporting a transparent printing member and another member respectively opposite said sensitized plate and said other plate, means for adjusting said common support in a direction to place different corresponding portions of said plates opposite their related opposing members, means for independently adjusting said members toward and from said plates, means for moving said printing member into and out of contact with said sensitized plate, and means for illuminating the printing member to make prints therefrom on the sensitized plate.

2. In a photographic printing apparatus, the combination of a common support on which a sensitized plate and another plate are mounted side by side in corresponding positions facing the same way, means for supporting a transparent printing member and another member respectively opposite said sensitized plate and said other plate, means for adjusting said common support in a direction to place different corresponding portions of said plates opposite their related opposing members, means for adjusting said printing member relatively to the sensitized plate, means for adjusting said other member into corresponding relation to said other plate, means for moving the printing member into and out of contact with said sensitized plate, and means for illuminating the printing member to make prints therefrom on the sensitized plate.

3. In a photographic printing apparatus, the combination of a common support on which a sensitized plate and another plate are mounted side by side in corresponding positions facing the same way, means for supporting a transparent printing member and another member respectively opposite said sensitized plate and said other plate, means for adjusting said common support in a direction to place different corresponding portions of said plates opposite their related opposing members, means for adjusting said printing member relatively to the sensitized plate, means for adjusting said other member into corresponding relation to said other plate, means for moving the printing member into and out of contact with said sensitized plate, a pressure device opposite the sentitized plate, means for moving the same to press the sensitized plate against the printing member, and means for illuminating the printing member to make prints therefrom on the sensitized plate.

4. In a photographic printing apparatus, the combination of a common support on which a sensitized plate and another plate are mounted side by side in corresponding positions facing the same way, means for supporting a transparent printing member and another member respectively opposite said sensitized plate and said other plate, means for adjusting said common support in a direction to place different corresponding portions of said plates opposite their related opposing members, means for adjusting said printing member toward and from the sensitized plate, means for moving the printing member into and out of contact with the sensitized plate, a pressure device opposite the sensitized plate, means for adjusting the pressure device toward and from the sensitized plate, means for moving the pressure device to press the sensitized plate against the printing member, and means for illuminating the printing member to make prints therefrom on the sensitized plate.

5. In a photographic printing apparatus, the combination of a common support on which a sensitized plate and another plate are mounted side by side in corresponding positions facing the same way, means for supporting a transparent printing member and another member respectively opposite said sensitized plate and said other plate, means for adjusting said common support in a direction to place different corresponding portions of said plates opposite their related opposing members, means for adjusting said printing member toward and from and parallel with the sensitized plate, means for moving the printing member into and out of contact with the sensitized plate, a pressure device opposite the sensitized plate, means for adjusting the pressure device toward and from and parallel with the sensitized plate, means for moving the pressure device to press the sensitized plate against the printing member, and means for illuminating the printing member to make prints therefrom on the sensitized plate.

6. In a photographic printing apparatus, the combination of a common support on which two sensitized plates are mounted side by side in corresponding positions facing the same way, means for supporting a transparent printing plate opposite each of said sensitized plates, means for adjusting said common support in a direction for placing different corresponding portions of said sensitized plates opposite their related printing plates, means for independently adjusting said printing plates toward and from said sensitized plates, common means for moving said printing plates into and out of contact with said sensitized plates, and means for illuminating the printing plates to make prints therefrom on the sensitized plates.

7. In a photographic printing apparatus, the combination of a common support on which two sensitized plates are mounted side by side in corresponding positions facing the same way, means for supporting a transparent printing plate opposite each of said sensitized plates, means for adjusting said common support in a direction for placing different corresponding portions of said sensitized plates opposite their related printing plates, means for independently adjusting said printing plates toward and from and also parallel with said sensitized plates, common means for moving said printing plates into and out of contact with said sensitized plates, and means for illuminating the printing plates to make prints therefrom on the sensitized plates.

8. In a photographic printing apparatus, the combination of a common support on which two sensitized plates are mounted side by side in corresponding positions facing the same way, means for independently securing and adjusting said sensitized plates on said support, means for supporting a transparent printing plate opposite each of said sensitized plates, means for adjusting said common support in a direction for placing different corresponding portions of said sensitized plates opposite their related printing plates, means for independently adjusting said printing plates toward and from said sensitized plates, common means for moving said printing plates into and out of contact with said sensitized plates, and means for illuminating the printing plates to make prints therefrom on the sensitized plates.

9. In a photographic printing apparatus, the combination of a common support on which two sensitized plates are mounted side by side in corresponding positions facing the same way, means for supporting a transparent printing plate opposite each of said sensitized plates, means for adjusting said common support in a direction for placing different corresponding portions of said sensitized plates opposite their related printing plates, a pressure device opposite each of said sensitized plates, means for independently adjusting said pressure devices toward and from the sensitized plates, common means for moving said printing plates into and out of contact with said sensitized plates, common means for moving said pressure devices to press the sensitized plates against the printing plates, and means for illuminating the printing plates to make prints on the sensitized plates.

10. In a photographic printing apparatus, the combination of a common support on which two sensitized plates are mounted side by side in corresponding positions facing the same way, means for supporting a transparent printing plate opposite each of said sensitized plates, means for adjusting said common support in a direction for placing different corresponding portions of said sensitized plates opposite their related printing plates, a pressure device opposite each of said sensitized plates, means for independently adjusting said pressure devices toward and from and also parallel with the sensitized plates, common means for moving said printing plates into and out of contact with said sensitized plates, common means for moving said pressure devices to press the sensitized plates against the printing plates, and means for illuminating the printing plates to make prints on the sensitized plates.

11. In a photographic printing apparatus, the combination of a common support on which two sensitized plates are mounted side by side in corresponding positions facing the same way, means for supporting a transparent printing plate opposite each of said sensitized plates, means for adjusting said common support in a direction for placing different corresponding portions of said sensitized plates opposite their related printing plates, means for independently adjusting said printing plates toward and from said sensitized plates, common means for moving said printing plates into and out of contact with said sensitized plates, a pressure device opposite each of said sensitized plates, means for independently adjusting said pressure devices toward and from the sensitized plates, common means for moving said pressure devices to press the sensitized plates against the printing plates, and means for illuminating the printing plates to make prints therefrom on the sensitized plates.

12. In a photographic printing apparatus, the combination of a common support on which a sensitized plate and another plate are mounted side by side in corresponding positions facing the same way, means for independently securing and adjusting said plates on said common support, means for supporting a transparent printing member and another member respectively opposite said sensitized plate and said other plate in corresponding relations thereto, means for adjusting said common support in a direction for placing different corresponding portions of said plates opposite their related opposing members, means for moving the printing member into and out of contact with said sensitized plate, and means for illuminating the printing member to make prints therefrom on the sensitized plate.

13. In a photographic printing apparatus, the combination of a common support on which a sensitized plate and another plate are mounted side by side in corresponding positions facing the same way, means for independently securing and adjusting said plates on said common support, common means for simultaneously actuating said securing means for the two plates, means for supporting a transparent printing member and another member respectively opposite said sensitized plate and said other plate in corresponding relations thereto, means for adjusting said common support in a direction for placing different corresponding portions of said plates opposite their related opposing members, means for moving the printing member into and out of contact with said sensitized plate, and means for illuminating the printing member to make prints therefrom on the sensitized plate.

14. In a photographic printing apparatus, the combination of a common support on which a sensitized plate and another plate are mounted side by side in corresponding position facing the same way, separate movable supports for holding a transparent printing member and another member respectively opposite said sensitized plate and said other plate, means for adjusting said common support in a direction to place different corresponding portions of said plates opposite their related opposing members, means for independently adjusting said printing member and other member on their supports, common means for moving said separate supports toward and from said plates, and means for illuminating the printing member to make prints therefrom on the sensitized plate.

15. In a photographic printing apparatus, the combination of a common support on which a sensitized plate and another plate are mounted side by side in corresponding positions facing the same way, separate movable supports for holding a transparent printing member and another member respectively opposite said sensitized plate and said other plate, means for adjusting said common support in a direction to place different corresponding portions of said plates opposite their related opposing members, a device to which said separate supports are releasably connected and which is operable to move said separate supports toward and from said plates, and means for illuminating the printing member to make prints therefrom on the sensitized plate.

16. In a photographic printing apparatus, the combination of a common support on which a sensitized plate and another plate are mounted side by side in corresponding positions facing the same way, separate movable supports for holding a transparent printing member and another member respectively opposite said sensitized plate and said other plate, means for adjusting said common support in a direction to place different corresponding portions of said plates opposite their related opposing members, means for independently adjusting said printing member and said other member on their supports, common means for moving said separate supports toward and from said plates, and a light chamber movable with the support for said printing member.

17. In a photographic printing apparatus, the combination of a common support on which a sensitized plate and another plate are mounted side by side in corresponding positions facing the same way, separate movable supports for holding a transparent printing member and another member respectively opposite said sensitized plate and said other plate, means for adjusting said common support in a direction to place different corresponding portions of said plates opposite their related opposing members, means for independently adjusting said printing member and said other member on their supports, common means for moving said separate supports toward and from said plates, and a light chamber movable with the support for said printing member and movable relatively thereto to and from a position opposite the printing member.

18. In a photographic printing apparatus, a traveling carriage, a guide track for the carriage, wheels arranged to roll on said track for guiding the carriage, eccentrics for adjusting said wheels relatively to the track, and adjusting means for each eccentric comprising a member connected to the eccentric, a screw for moving said member, and an adjustable member carrying said screw.

19. In a photographic printing apparatus, a printing plate support having a circular edge, guide wheels on which said support is arranged to rotate, eccentrics for adjusting said wheels relatively to said circular edge, and adjusting means for each eccentric comprising a member connected to the eccentric, a screw for moving said member, and an adjustable member carrying said screw.

20. In a photographic printing apparatus, a head on which the printing plate is mounted, a support having a circular opening in which said head is rotatable for adjusting the printing plate to different angular positions, and a rotatable screw ring between said head and said support for adjusting said printing plate perpendicularly to the plane of its face.

21. In a photographic printing apparatus, a sliding plate carrying frame, substantially parallel guide rails for said frame, guide bars connected to said frame and engaging said guide rails, and means which connect said guide bars to said frame and permit limited movement of said bars relatively to the frame to prevent the bars from binding on the guide rails.

22. In a photographic printing apparatus, the combination of a pressure head for causing firm contact of the sensitized and printing plates, a movable supporting carriage on which the pressure head is adjustable in a direction parallel with the contacting faces of said plates, guide means for said carriage which are adjustable for accurately placing the face of the pressure head parallel with the contacting faces of said plates, and means for moving said carriage toward and from said plates.

23. In a photographic printing apparatus, the combination of a pressure head for causing firm contact of the sensitized and printing plates, a movable supporting carriage on which the pressure head is adjustable in a direction parallel with the contacting faces of said plates, an eccentric for moving said carriage toward and from said plates, means which operatively connect said carriage with said eccentric and are operable for adjusting the carriage toward and from said plates relatively to the eccentric, and means for moving the carriage toward and from said plates independently of said eccentric.

24. In a photographic printing apparatus, a plate carrying frame, a supporting carriage on which said frame is adjustable in one direction and which is adjustable in a different direction, adjusting mechanism for said frame including a shaft journaled on said carriage, an operating wheel for said shaft through which the shaft is adapted to slide, a collar splined on the shaft, and a device which couples said wheel to said collar and permits said collar to shift laterally relatively to said wheel to prevent the shaft from binding in the wheel.

25. In a photographic printing apparatus, a plate supporting carriage, adjusting mechanism for the same including a rotatable member connected to the carriage, a band adapted to be contracted on said rotatable member to lock it from rotation, a lever connected to the band for contracting the same to hold said rotatable member, and a second lever for moving said first lever to expand said band and release said rotatable member.

26. In a photographic printing apparatus, the combination of holding means for supporting a flexible sensitized plate and another flexible plate side by side in corresponding positions, means for independently operating each of said holding means to tighten the plates, means for simultaneously operating the holding means for both of said plates to loosen the plates, means for supporting a transparent printing member and another member respectively opposite said sensitized plate and said other plate, adjusting means for placing different corresponding portions of said plates opposite their related opposing members, means for causing contact of said printing member with said sensitized plate, and means for illuminating the printing member to make prints therefrom on the sensitized plate.

27. In a photographic printing apparatus, the combination of means for supporting a sensitized plate and another plate side by side in corresponding positions comprising an adjustable holding member for each plate, independent adjusting means for each of said holding members, and means for simultaneously moving both of said holding members, means for supporting a transparent printing member and another member respectively opposite said sensitized plate and said other plate, adjusting means for placing different corresponding portions of said plates opposite their related opposing members, means for causing contact of said printing member with said sensitized plate, and means for illuminating the printing member to make prints therefrom on the sensitized plate.

28. In a photographic printing apparatus, the combination of means for supporting a sensitized plate and another plate side by side in corresponding positions comprising an adjustable holding member for each plate, screws for independently adjusting said holding members, and means for effecting a simultaneous endwise movement of the adjusting screws for both of said holding members, means for supporting a transparent printing member and another member respectively opposite said sensitized plate and said other plate, adjusting means for placing different corresponding portions of said plates opposite their related opposing members, means for causing contact of said printing member with said sensitized plate, and means for illuminating the printing member to make prints therefrom on the sensitized plate.

Witness my hand this 11th day of October, 1920.

WILLIAM C. HUEBNER.